US011938744B2

(12) United States Patent
Klages

(10) Patent No.: US 11,938,744 B2
(45) Date of Patent: Mar. 26, 2024

(54) TECHNIQUE FOR MARKING AN OBJECT

(71) Applicant: Phoenix Contact GmbH & Co. KG, Blomberg (DE)

(72) Inventor: Kilian Klages, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 183 days.

(21) Appl. No.: 17/765,850

(22) PCT Filed: Oct. 6, 2020

(86) PCT No.: PCT/EP2020/077975
§ 371 (c)(1),
(2) Date: Apr. 1, 2022

(87) PCT Pub. No.: WO2021/069427
PCT Pub. Date: Apr. 15, 2021

(65) Prior Publication Data

US 2023/0158818 A1 May 25, 2023

(30) Foreign Application Priority Data

Oct. 9, 2019 (DE) ..................... 10 2019 127 153.3

(51) Int. Cl.
*B41J 25/316* (2006.01)
*B41J 2/32* (2006.01)
*B41J 3/407* (2006.01)

(52) U.S. Cl.
CPC ............... *B41J 25/316* (2013.01); *B41J 2/32* (2013.01); *B41J 3/4075* (2013.01)

(58) Field of Classification Search
CPC . B41J 25/316; B41J 2/32; B41J 3/4075; B41J 3/44; B41J 15/04; H01B 13/344
(Continued)

(56) References Cited

U.S. PATENT DOCUMENTS

2003/0146943 A1 8/2003 Lehmkuhl et al.
2003/0146968 A1* 8/2003 Milton .................. B41J 3/4075 347/197

(Continued)

FOREIGN PATENT DOCUMENTS

EP 1468922 A1 10/2004

*Primary Examiner* — Matthew Luu
*Assistant Examiner* — Alexander D Shenderov
(74) *Attorney, Agent, or Firm* — LEYDIG, VOIT & MAYER, LTD.

(57) ABSTRACT

A device for providing a marking arranged or arrangeable around an object includes: a mechanical interface for releasably or irreversibly mounting the device to a printer; a material interface for receiving a print medium, which is printed by the printer using a print head, as a printed product in a longitudinal direction; at least one eccentric supported at the material interface to be pivotable about a pivot axis; and at least one print head actuator for moving the at least one eccentric to a first pivot position and to a second pivot position different from the first pivot position to provide the marking originating from the printed product. The eccentric, in a state of the device mounted to the printer using the mechanical interface, moves the print head and the print medium towards each other into a printing position for printing the print medium when the eccentric moves.

20 Claims, 13 Drawing Sheets

(58) Field of Classification Search
USPC .......................................................... 347/198
See application file for complete search history.

(56) References Cited

U.S. PATENT DOCUMENTS

| | | | | |
|---|---|---|---|---|
| 2004/0211522 | A1 | 10/2004 | Fries et al. | |
| 2008/0073023 | A1* | 3/2008 | Fries ......................... | B65C 3/02<br>156/443 |
| 2018/0104963 | A1* | 4/2018 | Benton .................... | B41J 2/325 |

* cited by examiner

TECHNIQUE FOR MARKING AN OBJECT

CROSS-REFERENCE TO PRIOR APPLICATIONS

This application is a U.S. National Phase application under 35 U.S.C. § 371 of International Application No. PCT/EP2020/077975, filed on Oct. 6, 2020, and claims benefit to German Patent Application No. DE 10 2019 127 153.3, filed on Oct. 9, 2019. The International Application was published in German on Apr. 15, 2021 as WO/2021/069427 under PCT Article 21(2).

FIELD

The invention relates to a technique for marking an object, for example a conductor. In particular, the invention relates to a device for providing a marking originating from a printed product that is arranged or arrangeable around an object.

BACKGROUND

For marking electrical conductors conventional label printers are used, for example, which print a label that has to be subsequently mounted on the conductor by manual work after the printing. The document US 2003/146943 A1 describes a printer that alternately prints and cuts a label.

Furthermore, special printers are known which may be used for conductor labeling. The document US 2004/0211522 A1 describes a device that winds a pre-printed wrap-around label, which is on a spindle roll, around a conductor. The document US 2008/0073023 A1 discloses a monolithic printing system for printing and applying wrap-around labels. The document EP 1468922 A1 also describes a printing system that may apply a wrap-around label around a conductor.

Such conventional printing systems can only print certain labels and apply them using an integrated automated application. No other printing applications are possible with such conventional printing systems.

If the functionality required for the application is shifted to a unit that can be separated from the printer, this extends the conveying path from a material interface where the printed product is transferred to the separable unit. This means that the printer must output the printed product unprinted beyond an end of the printing until the printed product reaches a processing position where the separable unit may begin application. However, since in many printing systems a printing material (for example, a color ribbon) and a print medium (i.e., the material on which is printed) are fed in parallel, the additional feed path without printing means that the printing material is wasted.

SUMMARY

In an embodiment, the present invention provides a device for providing a marking arranged or arrangeable around an object, comprising: a mechanical interface configured to releasably or irreversibly mount the device to a printer; a material interface configured to receive a print medium, which is printed by the printer using a print head, as a printed product in a longitudinal direction; at least one eccentric supported at the material interface to be pivotable about a pivot axis; and at least one print head actuator configured to move the at least one eccentric to a first pivot position and to a second pivot position different from the first pivot position to provide the marking originating from the printed product, wherein the eccentric is configured, in a state of the device mounted to the printer using the mechanical interface, to move the print head and the print medium towards each other into a printing position for printing the print medium when the eccentric moves into the first pivot position, and to move the print head and the print medium away from each other into an open position when the eccentric moves into the second pivot position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
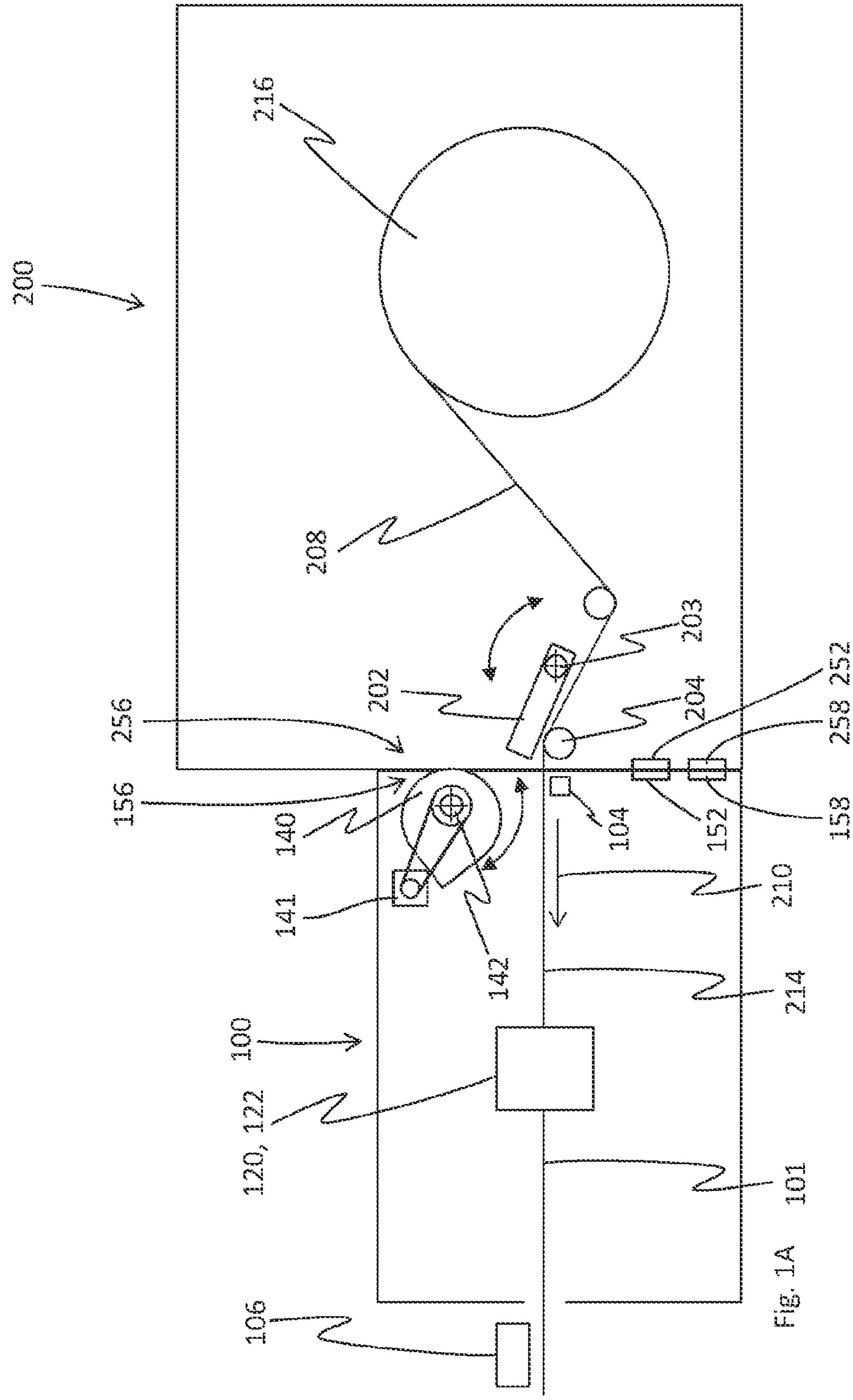
FIG. 1A a schematic sectional view of a device for providing a marking arranged or arrangeable around an object according to a first embodiment in a first pivot position and an embodiment of a printer in a printing position corresponding to the first pivot position.

In an embodiment, the present invention provides a device for a printing system preferably with the size and portability of a desktop device, so that the system may be converted in a short time to different applications of object marking, preferably different applications of conductor marking. An embodiment provides a convertible printing system that does not comprise increased material consumption compared to an integral system.

One aspect relates to a device for providing a marking arranged or arrangeable around an object, preferably a conductor. The device comprises a mechanical interface configured to releasably or irreversibly mount the device to a printer; a material interface configured to receive, as a printed product in a longitudinal direction, a print medium printed by the printer using a print head; at least one eccentric mounted on the material interface so as to be pivotable about a pivot axis; and at least one print head actuator configured to move the at least one eccentric into a first pivot position and into a second pivot position different from the first pivot position in order to provide the marking originating from the printed product. In the state of the device mounted to the printer using the mechanical interface, the eccentric is configured to move the print head and the print medium towards each other into a printing position for printing the print medium when moving into the first pivot position of the eccentric, and to move the print head and the print medium away from each other into an open position when moving into the second pivot position of the eccentric.

The device may be a device for circumferentially arranging a printed marking around a prolate object, preferably around a conductor.

The device may be configured as an applicator, a front module or front attachment of the printer, in particular of a thermal transfer printer. The device may be exchangeable. Each of a plurality of different embodiments of the device may be selectively attachable to the same printer.

For example, in the first pivot position, the eccentric may lower the print head onto the print medium. In the second pivot position, the eccentric may lift the print head off the print medium.

In one embodiment, the motion to the open position (for example, lifting off) of the print head may save the printing material when the print medium is fed in the longitudinal direction (i.e., an output at the material interface). In the same or another embodiment, the motion into the open position (for example, by lifting off) of the print head during a retraction (i.e., a retraction) of the printing material may prevent warping or crumpling of the printing material.

The printing material may rest in the open position while the print medium moves in the longitudinal direction (for example, using a print roller). During feed or advance, the print medium may be advanced (i.e., moved from the printer to the device). During retraction, the print medium may be retracted (i.e., moved from the device to the printer).

The print medium may be guided on a print roller. The first pivot position of the eccentric may correspond to the printing position (also: closed position) of the print head with respect to the print roller. The second pivot position of the eccentric may correspond to an open position of the print head with respect to the print roller. The material interface may be configured to receive the print medium printed on the print roller by the printer using the print head as a printed product.

A printing material, preferably a color ribbon, may be guided in the longitudinal direction between the print head and the print medium, preferably using a print roller. The printing material may abut the print head in the printing position and in the open position.

In the printing position, the printing material may abut the print medium and/or be mechanically coupled to the print medium in the longitudinal direction without slippage. In the open position, the printing material may be lifted off the print medium and/or mechanically decoupled.

The pivot axis may be perpendicular to the longitudinal direction. Alternatively or additionally, the pivot axis may be parallel to a plane of the printed product, parallel to a pivot axis of the print head, and/or parallel to an axis of rotation of the print roller.

The print head may be force-loaded or subject to a mechanical force, for example with a preload (or pretension or bias) from the open position to the printing position. In the second pivot position, the at least one eccentric may move the print head into the open position against the preload. The at least one eccentric may release the print head in the first pivot position for motion into the printing position.

In the second pivot position, the at least one eccentric may abut the print head, with a support surface eccentric to the pivot axis, on a side facing the material interface and/or the print roller.

Alternatively, the print head may be force-loaded or subject to a mechanical force with a preload (or bias) from the printing position to the open position. In the first pivot position, the at least one eccentric may move the print head into the printing position against the preload. In the second pivot position, the at least one eccentric may release the print head for motion into the open position.

In the first pivot position, the at least one eccentric may abut the print head, with a support surface eccentric to the pivot axis, on a side facing away from the material interface and/or the print roller.

The device may further comprise a suspension extending beyond the material interface and extending into the printer when the device is in the mounted state using the mechanical interface. The at least one eccentric may be pivotally arranged on the suspension.

The suspension may comprise at least two bolts parallel to each other. At a free-standing end of each bolt, a pivot bearing may support a shaft so that it can pivot about the pivot axis. The at least one eccentric may be arranged on the shaft in a rotationally fixed manner. The print head actuator may be coupled to the shaft for pivotal movement of the at least one eccentric.

The at least one eccentric may also be referred to as a tappet or rotary tappet. The at least one eccentric may be connected to the shaft in a rotationally fixed manner and arranged to lower the print head of the printer onto the print medium in the first pivot position for printing the print medium and to lift off the print head from the print medium or release it against a preload in the second pivot position of the shaft.

The device may be removably mounted to the mechanical interface with the printer. The data interface may be configured to communicate with the printer to provide (preferably apply) the marking. At the material interface, the device may receive the printed product (i.e., the print medium printed by the printer) that comprises the marking.

The device may further comprise a printing signal interface configured to detect or transmit a control signal for outputting the printed product. Alternatively or additionally, the device may comprise at least one sensor configured to detect a control signal for providing the marking.

The device may further comprise at least one further actuator (which may also be referred to as a provisioning actuator), which is configured to arrange the marking on the object in a circumferentially closed manner or to provide the marking for circumferentially closed arrangement, using the printed product output by the printer. For example, the at least one further actuator may be configured to arrange the marking on the object in a circumferentially closed manner or to provide it for circumferentially closed arrangement by means of the printed product output by the printer, depending on the control signal for outputting the printed product and/or the control signal for providing the marking.

The device may be a device for providing a marking arranged or arrangeable in a closed manner around a prolate object (preferably around a conductor).

The device may further comprise a control unit (in short: control system) or a regulating unit (in short: regulation). The control unit or regulating unit may be configured to move the eccentric into the second pivot position using the actuator prior to a feed of the printed product to a cutting position and/or prior to a retraction of the printed product already dispensed at the material interface and/or prior to a retraction of the print medium already dispensed at the material interface and still unprinted. Alternatively or additionally, the device may be configured to move the eccentric to the first pivot position using the actuator, for example after retraction of the printed product or the still unprinted print medium.

The control unit or regulating unit may be configured to send instructions to the printer via the data interface to feed and/or retract (i.e., pull back) the print medium and/or receive instructions to control the print head actuator of the printing position and/or the open position.

The control unit or the regulating unit may be configured to control or regulate the print head actuator for pivoting the eccentric, for example to the first or second pivot position, synchronously with or in coordination with the feed and/or retraction of the print medium. The control unit or the regulating unit may be configured to synchronize, via the data interface, an alternating operation of the at least one further actuator and the printer for providing (for example, applying) the marking.

The printer may receive an identifier or label via an interface (e.g., a network interface or a serial interface). The printer may be configured to print the received identifier or label onto the print medium using a printing material. The printing material may comprise a color ribbon, such as for thermal transfer printing. The printing medium (i.e., a substrate or printing material) may be a plastic film, for example for heat sealing or welding, or a heat shrink tube. The printed product may comprise the print medium printed using the printing material.

At the material interface, the printed medium (i.e., the printed product) printed using the printing material may be output by the printer. The printer may be configured to deliver the printed product to the device at the material interface, for example in response to communication between the printer and the device and/or a detection of the object to be marked.

The providing may comprise arranging the marking on the prolate object, preferably arranging the marking circumferentially about a longitudinal axis of the prolate object. The at least one actuator may be configured to circumferentially arrange the printed marking about a longitudinal axis of the object.

For example, the actuator may arrange or provide the marking when the control signal of the printing signal interface indicates the output of the printed product at the material interface and the control signal of the sensor indicates the presence of the object or a desired use to provide the marking.

The device and the printer may be arranged side by side, for example without a direct mechanical connection. For example, the printer and device may each be arranged in a stationary and/or non-slip manner on the same work surface. For example, a material interface of the printer may be aligned or in register with the material location of the device. There may be a clear gap between the printer and the device during operation.

The mounting may be irreversible, for example comprising a connection with a material bond. Alternatively, the device may be removably mounted to the printer, for example, may be non-destructively detachable, and/or may be mountable and/or detachable without tools.

The at least one sensor of the control signal for providing the marking may be configured to detect the object, preferably to detect a presence, a position, and/or a size of the object.

The control signal for providing the marking may indicate the presence (i.e., the availability), the position, and/or the size of the object. The position may comprise a location and/or orientation of the object (for example, a longitudinal axis of the object). The size may comprise a length (for example, along the longitudinal axis), a width, a diameter, and/or a circumference of the object.

The at least one sensor of the control signal for providing the marking may detect the object without contact.

The at least one sensor of the marking provision control signal may comprise a pushbutton. The marking provision control signal may indicate an actuation of the button (also: provision request).

The control signal for providing the marking may indicate a user request for providing the marking. The control signal for providing the marking may be a trigger signal. The actuator may be configured to arrange the marking on the object in a closed-loop manner or to provide the marking in a closed-loop manner in response to detecting the object and/or detecting the trigger signal.

The button may be a foot switch or a hand switch.

The printing signal interface may comprise a sensor configured to detect the printed product output by the printer, preferably to detect a presence, a position, and/or a feed of the output printed product.

The sensor for detecting the output of the printed product (also: sensor for detecting the output printed product or in short: sensor for detecting the printed product or printed product detection sensor) may be arranged at the material interface. The printed product detection sensor may detect the printed product without contact.

The at least one sensor may further comprise a sensor for detecting the printed product output from the printer. Detecting the printed product may comprise detecting the presence, a position (e.g., location and/or orientation), and/or a size (e.g., length and/or diameter) of the printed product.

Alternatively or additionally, the printing signal interface may comprise a data interface configured to communicate, preferably bidirectionally, with the printer for providing or arranging the marking.

The at least one actuator may be configured to (for example, in response to detecting the object and/or the trigger signal) process, in communication with the printer, the printed product output from the printer for marking and arrange the marking on the object or provide the marking for the arrangement.

The bidirectional communication may comprise receiving the control signal for outputting the printed product from the printer and sending a control signal for requesting output of the printed product to the printer. For example, the control signal for providing the marking may be forwarded to the printer as a request for output of the printed product via the data interface.

The printer may be configured to deliver the printed product to the device at the material interface, for example, in accordance with bidirectional communication and/or in response to the control signal to provide the marking.

The data interface may be configured for wireless communication, preferably using radio signals, infrared signals, and/or near-field communication.

The data interface may be configured to synchronize or coordinate an alternating and/or event-driven operation of the at least one actuator and the printer to provide or arrange the marking.

For example, a feed of the printed product executed by the printer may be alternately executed, synchronized and/or coordinated with cutting, folding and/or turning of the output printed product. The respective sub-steps executed during alternating and/or event-driven operation by the device or the printer for providing or arranging the marking may also be referred to as actions. The coordination of the sub-steps may also be referred to as action coordination.

The data interface may be configured to allow the printer to control the at least one actuator of the device, to read control signals from the at least one sensor and/or the printing signal interface of the device, and/or to read an identifier stored in the device.

The at least one actuator of the device may be controllable on the printer side using the data interface. Alternatively or additionally, measured values of the at least one sensor of the device may be interrogated using the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the printing signal interface.

The data interface may be electrically connected to the at least one actuator and/or the at least one sensor within the device via a control unit and/or a regulating unit. The control unit and/or regulating unit may determine parameters of the applicator from the detected measured values. The control commands sent to the printer may comprise the parameters and/or control the printer according to the parameters.

The data interface may be configured to send control signals (for example, control commands and/or confirmation messages) from the at least one sensor and/or the printing signal interface, and/or parameters determined from the (aforementioned) control signals, to the printer for providing or arranging the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or regulating unit may be further configured to obtain a control command from the printer via the data interface, execute control or regulation of the at least one actuator in accordance with the control command, and send feedback to the printer via the data interface in response to completion of execution of the control command.

The feedback may comprise a confirmation of the (for example successful) completion of the execution of the control command or an error message regarding an error during the execution of the control command. For example, the feedback may inform the printer that a defined state of the device has been reached, such as an end position of the at least one actuator.

The control unit or regulating unit may further be configured to determine a parameter of the arranging based on the control signal detected using the at least one sensor, and to send the determined parameter to the printer via the data interface.

The detected control signal may indicate a diameter or circumference of the object. The determined parameter may specify a length of a feed or a retraction of the printed product.

A control command sent from the device to the printer via the data interface may initiate the feed (or advance) or retract.

The control unit or regulating unit may autonomously perform the providing or arranging of the marking, or a substep of providing or arranging the marking, in accordance with the control command during the period between obtaining the control command from the printer and sending the feedback to the printer.

The device may further comprise an electrical interface configured to supply electrical power to the device via the printer.

The data interface and/or the electrical interface may be arranged relative to the mechanical interface to contact the printer for communication or supply of electrical power when the device is mounted to the printer using the mechanical interface.

The data interface may be arranged relative to the mechanical interface to contact the printer for communication when the device is mounted to the printer using the mechanical interface. The electrical interface may be arranged relative to the mechanical interface to contact the printer for power when the device is mounted to the printer using the mechanical interface. For example, mounting the device to the printer using the mechanical interface may cause contacts of the data interface and/or the electrical interface to come into contact.

The object may comprise a conductor or be a conductor. The conductor may be a current conductor or a light guide.

The mechanical interface may comprise a centering pin or an opening for receiving a centering pin and/or a lever and an eccentric connected to the lever in a rotationally fixed manner, which is configured for mounting the device to the printer without screws and/or without tools.

Another aspect relates to a system (also: printing system) for providing a marking arranged or arrangeable around an object, preferably around a conductor. The system comprises a printer, preferably a thermal transfer printer, configured to output, as a printed product in a longitudinal direction, a print medium printed using a print head. Furthermore, the system comprises a device according to an embodiment of the device aspect, wherein in the state of the device mounted to the printer using the mechanical interface, the material interface is arranged relative to the printer to receive the printed product output by the printer.

The system may be a printing system for providing a marking arranged or arrangeable in a closed loop around a prolate object, preferably around a conductor.

Embodiments of the device enable a modular system (also: printing system) that may be based on a single printer, for example a desktop device, so that this printer may be converted in a short time or a few steps to the different applications of object marking, preferably conductor marking. For example, a user may quickly and easily form a system from a normal or application-unspecific label printer for assisting in applying a marking (for example, a label) to the prolate object to be marked, preferably the conductor to be marked.

The terms application and applying (preferably as a process step) may be interpreted herein synonymously or interchangeably. The terms arrangement and arranging may (preferably as a process step) be interpreted herein synonymously or interchangeably.

Applying the marking to the prolate object (preferably to the conductor) may comprise arranging the marking on the prolate object. Providing the marking circumferentially arranged or arrangeable closed around the prolate object (preferably around the conductor) may comprise cutting (preferably trimming) the printed product.

The prolate object may be an elongated object. At least in sections, the prolate object may be a (for example general) cylinder, preferably a circular cylinder or a prism.

The prolate object may comprise a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongated object for conducting signals or substances. For example, the conductor may be an elongated object for conducting electrical current and/or electromagnetic radiation (preferably light). The vessel may be a test tube or a sample tube, for example for holding and/or transporting a fluid.

The conductor may comprise an electrical conductor and/or an optical fiber.

The conductor may comprise one core (or wire or line) or two, at least two, three or more cores (or wires or lines) electrically insulated or optically decoupled from each other. The cores (or wires or lines) may extend parallel to each other or may be twisted together (for example in pairs).

The conductor may be a single, multiple, fine and/or superfine stranded conductor (or wire or line). The conductor may be a cable, cable bundle and/or ribbon cable. The conductor may be a light guide (also: light guide cable). The conductor may be a tube and/or a fluid line.

The conductor may be a cylindrical body and/or a non-rotationally symmetrical elongated body. The conduction of the signals or substances may be directed along a longitudinal axis of the conductor and/or extend between ends of the conductor.

By allowing embodiments of the device for a specific application to be attached to a printer that is not specific to the application, special printers for the respective application, and thus costs, may be avoided and/or resources may be used more effectively. For example, a utilization rate of the printer may be increased as a result. The same or further embodiments of the device may reduce a downstream manual effort in mounting the printing materials on the objects to be marked.

FIG. 1A shows a first embodiment of a device generally designated by reference numeral 100 for providing (for example, dispensing, arranging, and/or applying) a marking 101 arranged or arrangeable around an object, preferably a prolate object or conductor. The marking 101 is preferably arranged or arrangeable in a closed circumferential manner around the object, for example, circumferentially around the longitudinal axis of the prolate object or conductor.

The device 100 is described and shown in the context of an embodiment of a printer generally designated by reference numeral 200. The embodiments of the device 100 and the printer 200 form one embodiment of a printing system. In principle, various embodiments of the printer 200 may be combinable with an embodiment of the device 100, and/or various embodiments of the device 100 may be combinable with an embodiment of the printer 200.

The first embodiment of the device 100 shown in FIG. 1A for providing a marking 101 arranged or arrangeable around an object (preferably around a conductor) comprises a mechanical interface 152 for releasably (for example, removably or demountably) or irreversibly (for example, adhesively) mounting the device 100 to a printer 200. A material interface 156 of the device 100 is configured to receive a print medium 208 printed by the printer 200 using a print head 202 as a printed product 214 in a longitudinal direction 210.

Mechanical interface 152 and material interface 156 of device 100 may correspond to a mechanical interface 252 for mounting device 100 and a material interface 256 of printer 200 for outputting printed product 214.

The printer 200 may comprise a roller 216 from which the print medium 208 may be removed or taken during a feed of the print medium 208 in the longitudinal direction 210 (for example, for printing in the printing position of the print head 202 or a non-printing feed in the open position of the print head 202).

Furthermore, the device 100 comprises at least one eccentric 140 mounted on the material interface 156 so as to be pivotable about a pivot axis 142 and at least one print head actuator 141 (in short: actuator, for example an electric motor) configured to move the at least one eccentric 140 into a first pivot position and into a second pivot position different from the first pivot position when the marking 101 is provided originating from the printed product 214. The eccentric 140 is configured to, in the state of the device 100 mounted to the printer 200 using the mechanical interface 152, move the print head 202 and the print medium 208 toward each other into a printing position for printing on the print medium 208 when the eccentric 140 moves into the first pivot position, and to move the print head 202 and the print medium 208 away from each other into an open position when the eccentric 140 moves into the second pivot position.

Optionally, in the first pivot position, the eccentric 140 transmits a force to the print head 202 of the printer 200 that moves the print head 202 into the printing position or holds it in the printing position. This may not be necessary, for example, in the first embodiment of the device 100 in FIG. 1A, if the print head 202 is prestressed (or biased) into the first pivot position.

In the second pivot position, the eccentric 140 optionally transmits a motion to the print head 202 of the printer 200 that moves the print head 202 to the open position or holds it in the open position. This is exemplified based on FIG. 1B for the first embodiment of the device 100 with the eccentric 140 in the second pivot position.

Optionally, the device 100 comprises a printing signal interface configured to detect a control signal for outputting the printed product 214. For example, the printing signal interface may comprise a sensor generally designated herein by reference numeral 104 and/or a data interface generally designated herein by reference numeral 158. The sensor 104 may generate a corresponding control signal in response to the output of the printed product 214. The data interface 158 of the device 100 may receive the control signal from the printer 200 to output the printed product 214.

The data interface 158 of the device 100 may correspond to a data interface 258 of the printer 200.

Optionally, the device 100 may comprise at least one sensor 106 configured to detect a control signal for providing the marking 101. The sensor 106 may comprise a sensor configured to output the provisioning control signal in response to the presence of the object 102. Alternatively or additionally, the sensor 106 may comprise a button configured to detect a provisioning request from a user.

Preferably, the device 100 comprises at least one providing actuator (in short: actuator, for example at least one of the first and second actuators generally designated herein by reference numerals 120 and 122, respectively) configured to arrange the marking 101 on the object 102 in a circumferentially closed manner or to provide the marking 101 for circumferentially closed arrangement, depending on the control signal for outputting the printed product 214 and the control signal for providing the marking 101 by means of the printed product 214 output by the printer 200.

For example, the printing signal interface comprises a data interface 158 configured to communicate with the printer 200 for providing the printed marking 101. The control signal for outputting the printed product 214 may be received by the printer 200 (for example, its control system). Alternatively or additionally, the printing signal interface comprises a sensor 104 configured to detect the output of the printed product 214.

For example, the sensor 106 of the device 100 is configured to detect the object 102, preferably the conductor (for example, its presence and/or size, preferably width or diameter). Alternatively or additionally, the sensor 106 comprises a pushbutton whose actuation initiates the provisioning.

Through the material interface 156, the device 100 receives the printed product 214 output by the printer 200. The at least one provisioning actuator (for example, at least one of the actuators generally designated herein by reference numerals 120 and 122) of the device 100 may be configured (preferably controlled) to provide the marking 101 and/or apply (for example, arrange) the marking 101 to the object 102 (preferably the conductor) using the printed product 214 output by the printer 200 in response to communication with the printer 200 (for example, via the data interface 158) and/or detection of the object 102 (preferably the conductor), for example, using the sensor 106.

Figure 1B:
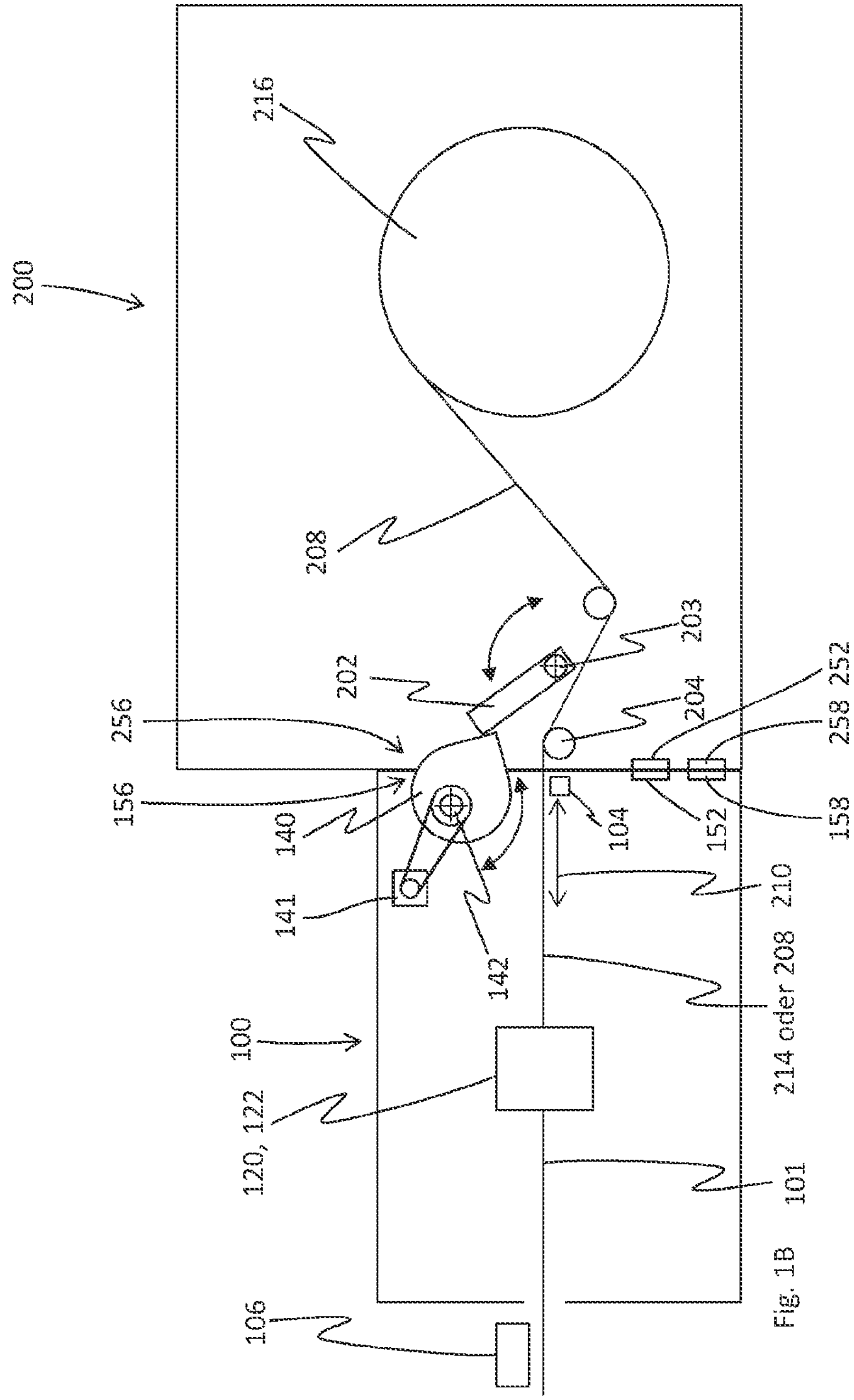
FIG. 1B a schematic sectional view of the device according to the first embodiment in a second pivot position and of the embodiment of the printer in an open position corresponding to the second pivot position.

The first embodiment of the device 100 shown in FIGS. 1A and 1B is mounted to an embodiment of the printer generally designated by reference numeral 200.

While the embodiment of the printer 200 is shown and described in FIGS. 1A and 1B in connection with the first embodiment of the device 100, any or all of the further embodiments of the device 100 may also be attachable (preferably alternately) to the embodiment of the printer 200.

The embodiment of the printer 200 comprises a print head 202. For example, the print head 202 is pivotable about a pivot axis 203 between the open position and the printing position. Preferably, the printer 200 comprises a print roller 204. In the open position, print head 202 and print roller 204 may be spaced apart. In the closed position, the print head 202 and the print roller 204 may abut each other (for example, except for the print medium 208 and/or the printing material 206).

In a first group of embodiments, the print head 202 is pretensioned (or biased) from the open position towards the printing position using a resilient element, for example according to the first embodiment. A support surface of the eccentric 140 may abut on a side of the print head 202 facing the printing position and/or abut on a side of the print head 202 facing away from the open position, in the second pivot position of the eccentric 140.

In a second group of embodiments, the print head 202 is pretensioned (or biased) from the printing position towards the open position using a resilient element, for example according to the second embodiment described below. A support surface of the eccentric 140 may abut on a side of the print head 202 facing the open position and/or abut on a side of the print head 202 facing away from the printing position in the first pivot position of the eccentric 140.

In a third group of embodiments, the print head 202 is mechanically bistable with respect to the printing position and the open position. During motion to the first pivot position, the eccentric 140 may move the print head 202 toward the printing position via a tipping point between the printing position and the open position, whereupon the print head 202 assumes the printing position. During the motion into the second pivot position, the eccentric 140 may move the print head 202 over the tipping point towards the open position, whereupon the print head 202 assumes the open position.

Figure 2A:
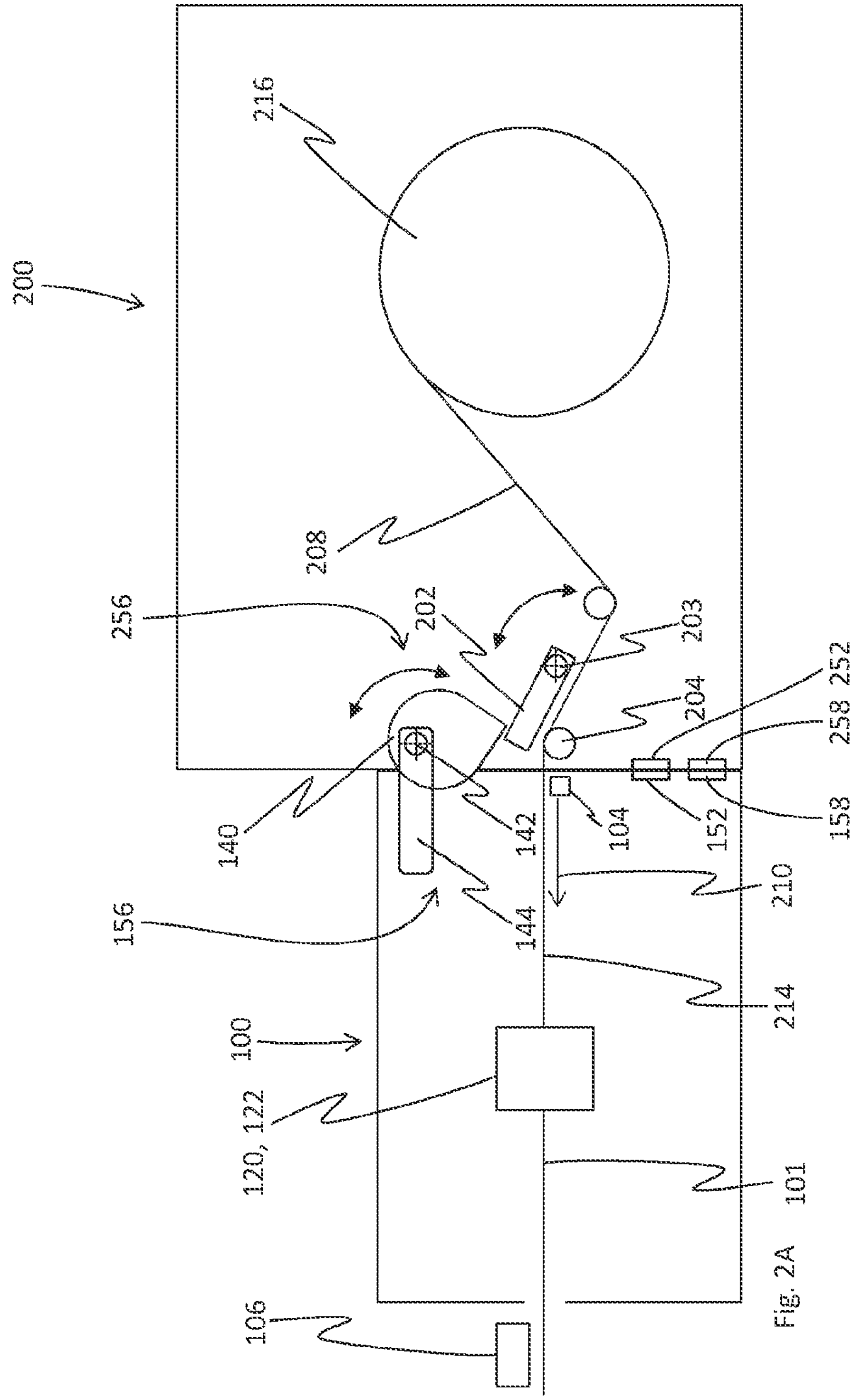
FIG. 2A a schematic sectional view of a device for providing a marking arranged or arrangeable around an object according to a second embodiment in a first pivot position and of an embodiment of a printer in a printing position corresponding to the first pivot position.
Figure 2B:
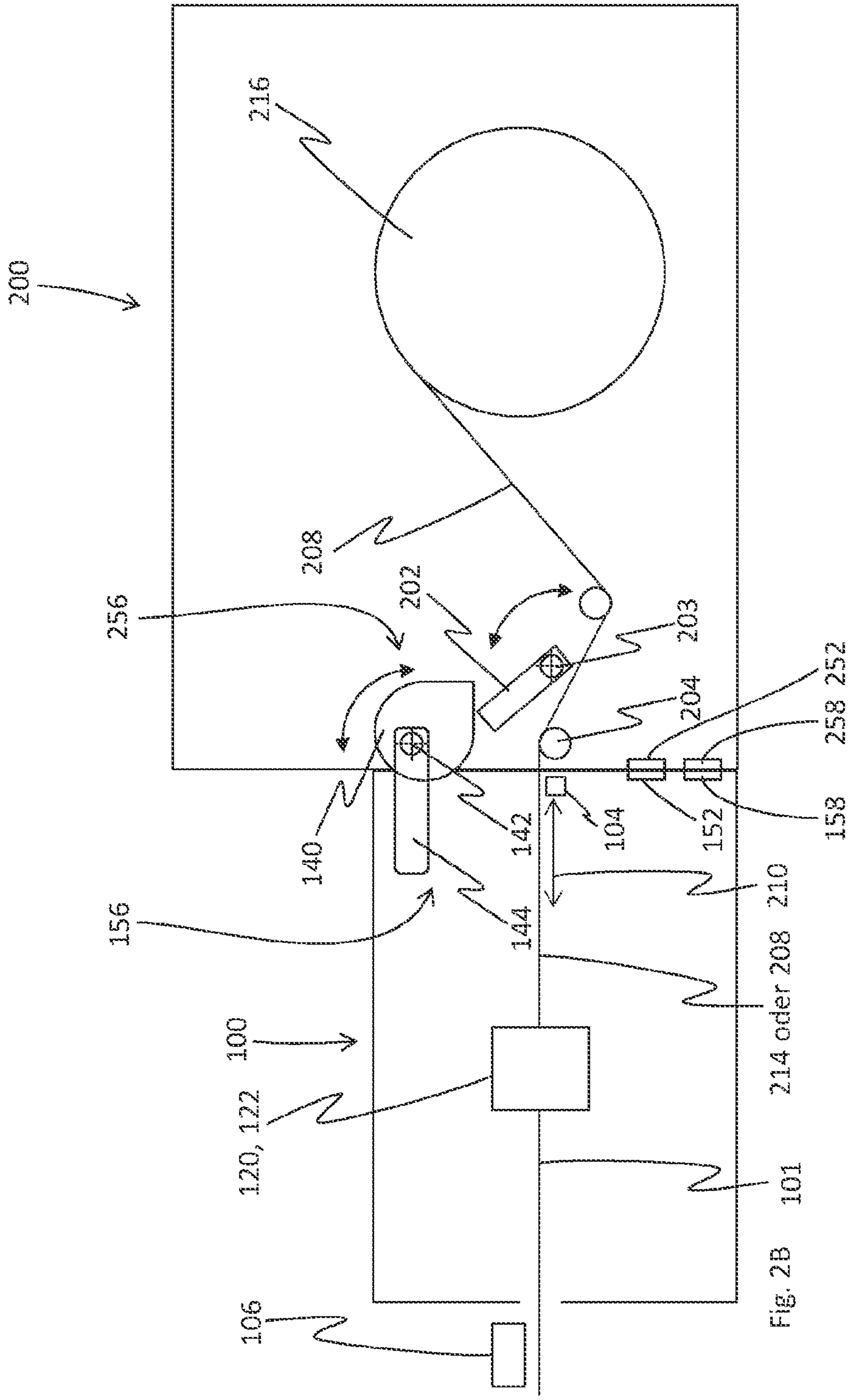
FIG. 2B a schematic sectional view of the device according to the second embodiment in a second pivot position and of the embodiment of the printer in an open position corresponding to the second pivot position.

FIGS. 2A and 2B illustrate a second embodiment of the device 100 in the first and second pivot positions, respectively. The second embodiment may be implemented independently or as a further development of the first embodiment.

For clarity, the eccentric 140 and its pivot axis 142 are drawn without the print head actuator 141 (in short: actuator 141) in the following figures. In any embodiment, the actuator 141 may be coupled to the eccentric 140 for leg movement via a chain drive or belt drive (for example, as shown schematically in FIGS. 1A and 1B), or may be arranged directly on the pivot axis 142 for leg movement of the eccentric 140.

The device 100 comprises a suspension 144 for pivotally supporting the eccentric 140. The eccentric 140 is pivotally supported on the suspension 144 about the pivot axis 142. Preferably, the suspension 144 cantilevers at the material interface 156.

The pivot axis 142 of the eccentric 140 is arranged at an end of the suspension 144 spaced from the device 100. The pivot axis 142 of the eccentric 140 is external to a housing of the device 100 and/or, when mounted (i.e., mounted) to the material interface 156, is internal to the printer 200.

For example, the suspension comprises two mutually parallel bolts arranged at the material interface 156 and extending parallel to each other. At the end spaced from the material interface 156, the bolts may each comprise a bearing. The bearings may support a shaft on which at least one eccentric 140 is arranged.

As shown schematically in FIGS. 2A and 2B, the suspension 144 may allow the at least one eccentric 140 to abut the print head 202 on a side away from the material interface 156. This allows, for example, motion of the print head 202 biased from the printing position to the open position by the at least one eccentric 140.

Figure 3B:
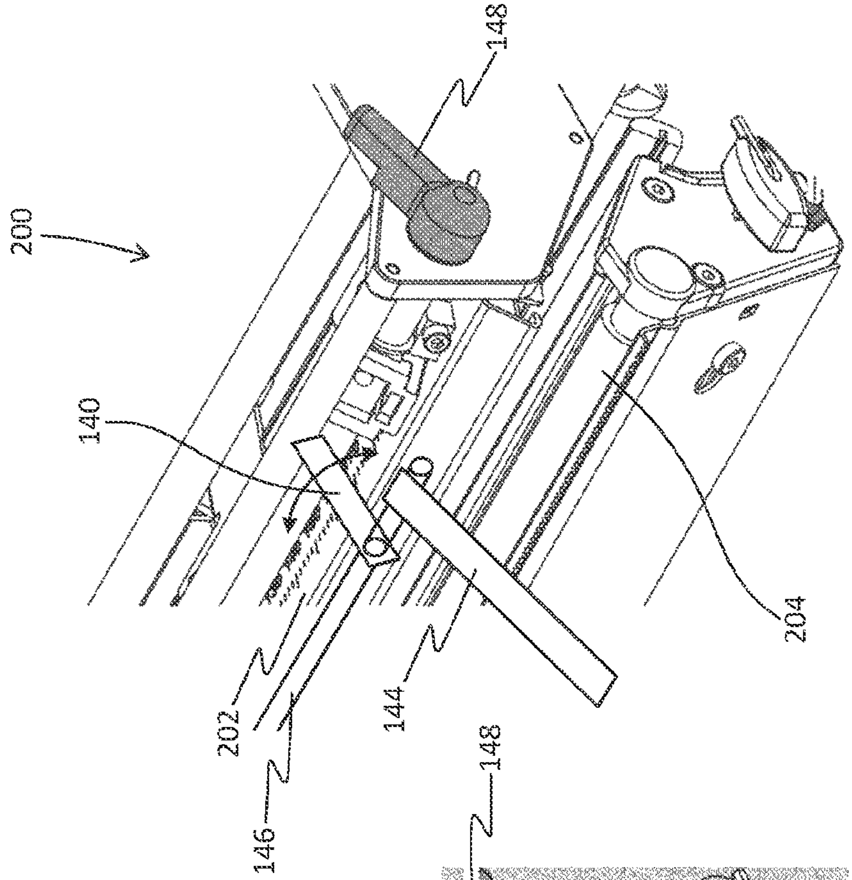
FIG. 3B a schematic perspective view of a part of the device according to the third embodiment in a second pivot position and of the embodiment of the printer in an open position corresponding to the second pivot position.
Figure 3A:
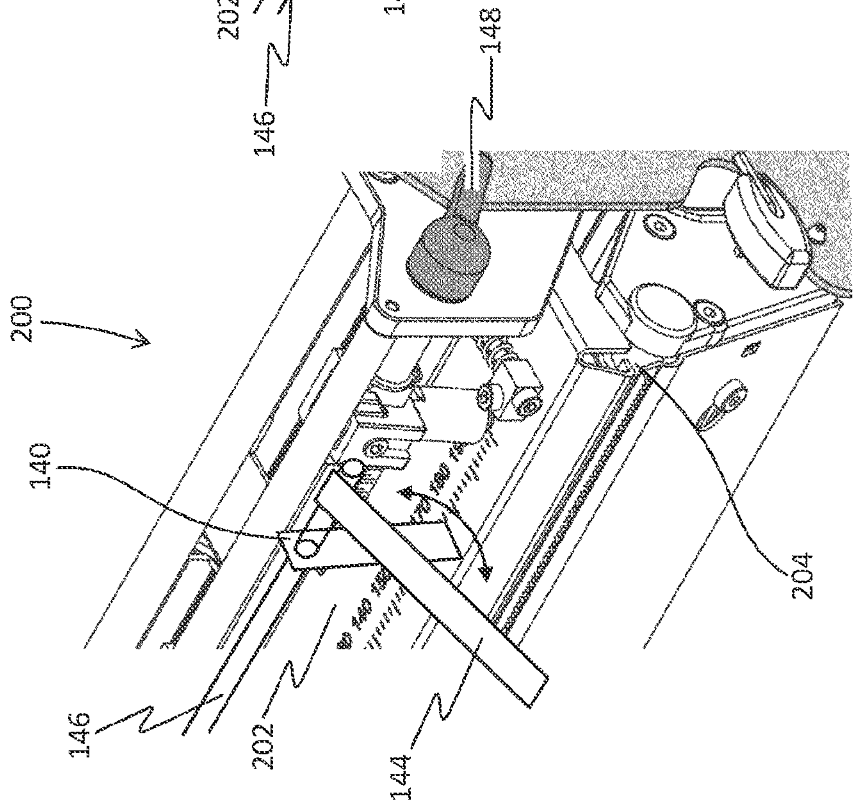
FIG. 3A a schematic perspective view of a part of a device for providing a marking arranged or arrangeable around an object according to a third embodiment in a first pivot position and of an embodiment of a printer in a printing position corresponding to the first pivot position.

FIG. 3A shows a perspective view of a portion of the device 100 according to a third embodiment in the first pivot position of the eccentric 140. The device 100 is mounted to an embodiment of the printer 200. The print head 202 is in a printing position corresponding to the first pivot position of the eccentric 140. FIG. 3B shows the portion of the device 100 according to the third embodiment in the second pivot position of the eccentric 140. The print head 202 of the embodiment of the printer 200 is in an open position corresponding to the second pivot position of the eccentric 140.

In any of the embodiments, the device 100, preferably a control system of the device 100, is capable of moving the print head 202 between the printing position and the open position, for example lifting it off the print roller 204, through the eccentric 140 and its actuator 141.

As a result, it is not necessary to adapt the printer 200 to the function of the device 100. For example, conventional printers 200 that are not configured to provide automatic motion of the print head 202 may be used with the device 100 (for example, an applicator 100) to provide (for example, apply) the marking 101.

In the conventional printer 200 shown in FIGS. 3A and 3B, the print head 202 may be raised manually by the operator. For this purpose, a lever 148 connected to a shaft in a rotationally fixed manner is provided. Manual tappets are arranged on the shaft in a rotationally fixed manner, which move the print head 202 into the open position (FIG. 3B) or printing position (FIG. 3A). This is necessary, for example, to insert the print medium 208 or the printing material 206 (for example, a color ribbon).

In order to save the printing material 206 (for example, the color ribbon) during feed (i.e., advancing) of the print medium 208 and/or to prevent wrinkling of the printing material 206 (for example, the color ribbon) during retraction (i.e., retracting), the device 100 may use the actuator 141 and the eccentric 140 to move the print head 202 from the printing position to the open position, for example, to raise it by a motor.

For this purpose, the lever 148 remains in the position that corresponds to the open position when the print head 202 is operated manually.

Since a motor integrated into the printer 200 for lifting off the print head 202 would incur costs, and since this motor is not required in all applications, there are printers (such as the one shown in FIGS. 3A and 3B) without the function of lifting off the print head 202 by motor.

In order to lift the print head 202 by motor in these printers 200 as well the actuator 141 and the eccentric 140 may be incorporated in the applicator 100 itself, i.e. according to an embodiment of the device 100.

The third embodiment partially shown in FIGS. 3A and 3B comprises a shaft 146 rotatably mounted at two spaced positions on a respective suspension 144. The at least one eccentric 140 is non-rotatably arranged on the shaft 146 as a tappet. The shaft 146 and the actuator 141 (for example, an electric motor) are thereby mounted on a base plate of the applicator 100. The base plate comprises the mechanical interface 152 and/or an opening corresponding to the material interface 156, so that when the applicator 100 is mounted on the printer 200 (for example, without its own drive for lifting the print head), a function is available for automatically moving the print head 202 between the open position and the printing position.

The function for automatic motion of the print head 202 between the open position and the printing position may, for example, be used or controlled by a control system of the applicator 100 and/or a control system of the printer when providing (for example, applying) the marking 101.

For a concise description, and without limitation of the prolate object 102, a conductor is described below as an example of the prolate object 102.

Preferably, each embodiment of the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

Optionally, each embodiment of the device 100 comprises a control unit 130 or regulating unit 130 configured to control or regulate the at least one or each actuator (for example, the actuator 120, 122 and/or 141) of the device 100, for example, according to a controlled variable whose actual value is detected by the sensor 106 as measured values. Alternatively or additionally, the control unit 130 or the regulating unit 130 may be configured to detect the measured values of the at least one sensor 104 and/or 106 and send them to the printer 200 via the data interface 158. Alternatively or additionally, the control unit 130 or the regulating unit 130 may be configured to receive control commands for controlling or regulating the at least one actuator (for example, the actuator 120, 122, and/or 141) from the printer 200 via the data interface 158 and/or to send control commands for controlling or regulating the printer 200 to the printer 200 based on measured values of the at least one sensor 106.

The printed product 214 may be a print medium 208 printed by the printer 200. The print medium 208 may be a printable tape (preferably plastic tape or adhesive tape) or a printable film (preferably plastic film or adhesive film). The printable film may comprise a self-adhesive layer on a side opposite the printing, or may be heat-sealable to itself (preferably end-to-end) and/or the conductor. Alternatively or additionally, the print medium 208 may comprise a tube (for example, a shrink tube).

The first actuator 120 (also: cutting unit) may be configured to cut the printed product 214. The cutting unit may be configured to cut through the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The transverse direction 121 may be parallel to the pivot axis 142 of the eccentric 140.

The marking 101 may comprise a portion of the printed product 214, such as a portion of the printed product 214 cut or arranged by the device 100 using the at least one actuator 120 and/or 122. The marking 101 may also be referred to as a label.

The marking 101 may be a printed wrap-around label, a printed flag label, or a printed section of the tube.

The application of the marking 101 to the conductor 102 may comprise a material connection of the marking 101 to the conductor 102. For this purpose, the marking 101 may be self-adhesive or bondable by heat. For example, the marking 101 may be a flag label that is wrapped around the conductor 102 during application and connected to itself in a two-dimensional manner at both ends of the marking 101. In another example, the marking 101 may be a wraparound label that is wrapped around the conductor 102 and connected to itself in a two-dimensional manner during application. Alternatively or additionally, applying the marking 101 to the conductor 102 may comprise a positively (for example, displaceable in the longitudinal direction of the conductor) connection of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 using the at least one actuator 120 may comprise opening the tube and/or sliding the tube (for example, the shrink tube) onto the conductor 102 as the marking 101, wrapping the conductor 102 with the marking 101, wrapping the marking 101 around the conductor 102 and closing the marking 101 as a flag label, inserting the marking 101 into a transparent grommet on the conductor 102, and/or printing a tag as the marking 101 that may be clipped around the conductor 102.

The device 100 may be configured to apply the marking 101 to the conductor 102 when the conductor 102 is already mounted (for example, when ends of the conductor are contacted and/or not free ends). For example, during application, the conductor 102 may not be rotated about a transverse axis transverse to the longitudinal direction of the conductor 102, may not be rotated about a longitudinal axis parallel to the longitudinal direction of the conductor 102, and/or may be at rest.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example in terms of printing (preferably in that the printer 200 is a thermal transfer printer), in terms of the material of the print medium 208 (for example in that the print medium is a plastic film), and/or in terms of the connection to the conductor 102 (for example in that the marking 101 is positively or adhesively connected to the conductor 102).

A marking 101 may be space-saving, for example so that a plurality of conductors 102 each carrying such a marking 101 may be arranged closely together. Alternatively or additionally, the marking 101 may be displaceable and/or rotatable, for example by positively connecting the marking 101 to the conductor 102. This may allow the marking 101 to be aligned on conductors 102 (such as cables) that are in close proximity to each other.

The embodiment of the printer 200 disclosed in the context of the first, second, and third embodiments of the device 100 may further comprise at least one or all of the features disclosed below in the context of the fourth embodiment of the device 100 or FIG. 4.

Further, the printer 200 may comprise a light barrier 212 for detecting the print medium 208 (i.e., the material to be printed), for example, for detecting control holes, control marks (e.g., black control marks), a beginning and/or an end of the printing material 208. For example, the printing material 206 is a color ribbon.

The media or material 208 to be printed is guided between the print head 202 and the print roller 204 along with the color ribbon 206. The light barrier 212 may detect a beginning of the print medium 208 during printing to ensure positioning of the printed image within the portion of the printed product 214, which portion is used for forming the marking 101.

The printer 200 comprises interfaces that are spatially associated with and/or functionally correspond to the interfaces of the device 100, respectively. The spatially assigned and/or functionally corresponding interfaces are connected or connectable to each other in pairs.

Preferably, the printer 200 comprises a mechanical interface 252 that is connected to, or is connectable to, or in communication or exchange or configured for communication or exchange with the mechanical interface 152 of the device 100. Preferably, the spatial association implies that when the mechanical interface 152 and 252 are connected (e.g., interlocked), the other interfaces of the device 100 and the printer 200 are also mutually connected or brought into communication or exchange.

Alternatively or additionally, the printer 200 comprises a data interface 258 that is connected or connectable to, or in communication or exchange with, the data interface 158 of the device 100. Alternatively or additionally, the printer 200 comprises a material interface 256 that is connected or connectable to, or in communication or exchange with, the material interface 156 of the device 100.

For example, the material interfaces 156 and 256 are in connection, or can exchange, the printed product 214. The data interfaces 158 and 258 are in communication or connection for exchanging measurement data from the respective sensors 104, 106, and/or 212 and/or control commands from the control unit 130 of the device and/or from a control unit 230 of the printer 200.

Figure 4:
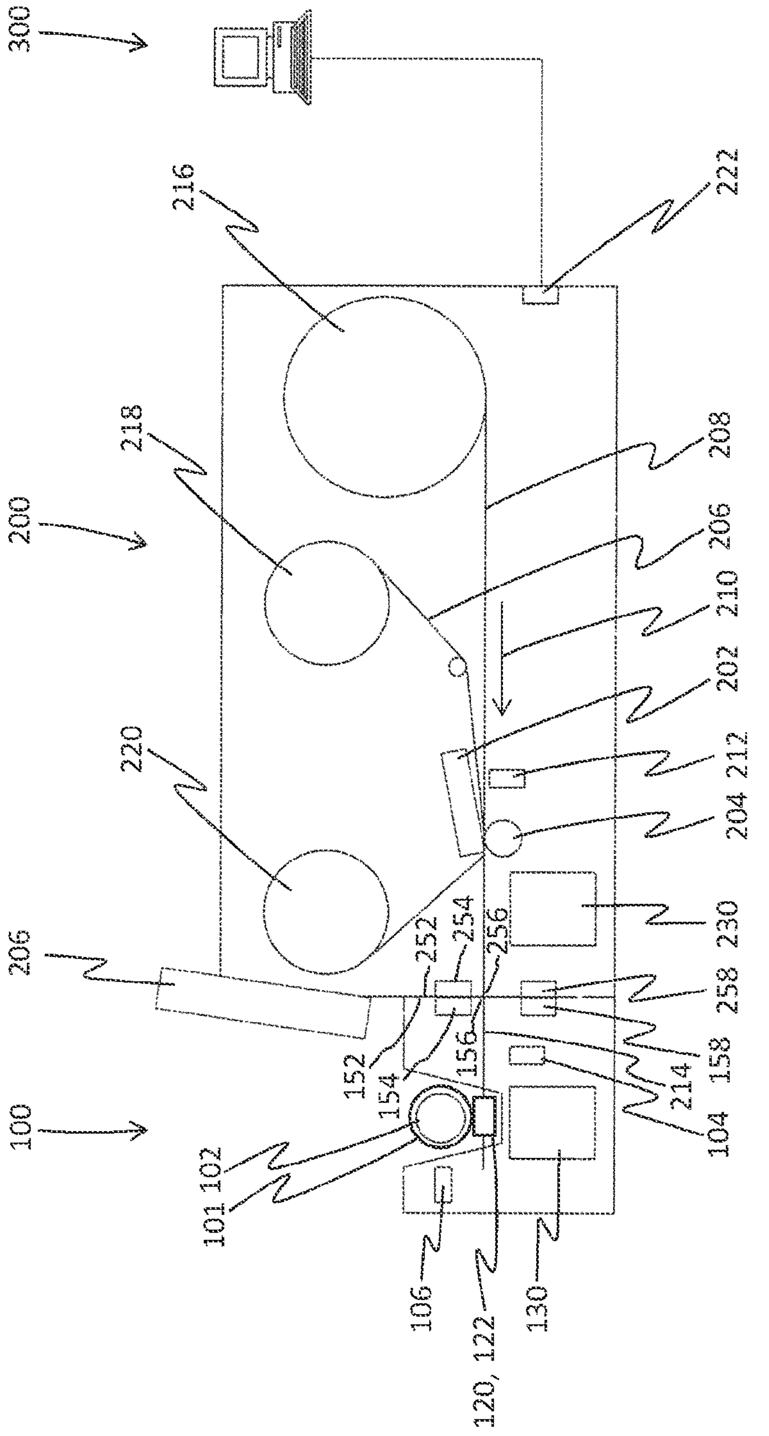
FIG. 4 a schematic sectional view of a fourth embodiment of a device for providing a marking arranged or arrangeable around an object, mounted on an embodiment of a printer.

Optionally, as shown by way of example in FIG. 4, the printer 200 comprises an interface 222 to a computer or computer network 300 (for example, a connection to the Internet). The printer 200 (for example, its controller or control unit 230) may receive print jobs via the interface 222.

The device 100 for applying the marking 101 to the conductor 102 is also referred to as an applicator.

An embodiment of the applicator 100 (for example, the aforementioned first embodiment of the applicator 100) or a printing system (for short: system) comprising an embodiment of the applicator 100 and an embodiment of the printer 200 (for example, the aforementioned embodiment of the printer) are configured to perform one or more of the following functions and method steps.

The applicator 100 and the printer 200 may perform operations (which are also referred to as actions), i.e., a set of one or plurality of process steps, alternately, in particular when applying the marking 101 to the conductor 102. In doing so, the applicator 100 and the printer 200 communicate with each other via the data interfaces 158 and 258, respectively, for example, in order to coordinate parameters and/or timing of the operations (preferably of the next operation in each case). The alternating execution of the operations is also referred to as interleaved operation of the applicator 100 and the printer 200.

In a first implementation, an overall procedure control (or sequence control) is stored (e.g., implemented or executably stored) in the printer 200, for example, in the control unit 230 (preferably by means of firmware stored in the control unit 230). The overall procedure control may comprise printing on the print medium 208 and applying the printed product 214 resulting from the printing.

A procedure control (or sequence control) of the applicator 100 may be stored (e.g., implemented or executably stored) in the applicator 100 and/or the printer 200. The procedure control of the applicator 100 may comprise (preferably exclusively) applying the marking 101 to the conductor 102 using the printed product 214. For example, the marking 101 is applied to the conductor 102 by executing the procedure control of the applicator 100.

In other words, executing the procedure control of the applicator 100 may be partially or entirely in the applicator 100 or exclusively executed in the printer 200. In any case, executing the procedure control of the applicator 100 causes the marking 101 to be applied to the conductor by means of the applicator 100.

In any embodiment, when the sequence control provides for feed of the print medium 208 without printing using the print head 200 and/or retraction of the print medium 208, the control unit 130 and/or 230 may control the print head actuator 141 to move the eccentric 140 from the first pivot position to the second pivot position, thereby moving the print head 202 from the printing position to the open position.

In a first variant of the first implementation, the procedure control (e.g., sequence control) of the applicator 100 is stored in the printer 200. The applicator 100 preferably does not have any sequence control, for example, it also does not have a control unit 130. The control unit 230 of the printer (for example, the firmware of the printer 200 in the control unit 230) is configured to (preferably individually) control (or drive) the actuators (for example 120 and/or 122 and/or 141) or (preferably individually) query (or detect) the sensors (for example, 104 and/or 106) of the applicator 100 via the data interfaces 158 and 258.

In a second variation of the first implementation, the procedure control (e.g., sequence control) of the applicator 100 is stored (e.g., implemented or executably stored) in the applicator 100. For example, the applicator 100 comprises the control unit 130 or the regulating unit 130 in which the sequence control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a regulator (e.g., closed-loop control) is optionally comprised.

The execution of the procedure control (or sequence control) (preferably in the control unit 130) is started by the printer 200 (for example, the control unit 230, preferably by means of the printer firmware). For this purpose, the applicator 100 may receive a control command via the data interface 158 or may be energized via the electrical interface 154. As soon as an operation of the applicator 100 is required, the printer 200 (for example, the control unit 230, preferably by means of the printer firmware) sends a signal as a control command to the applicator 100 via the data interface 258 or 158.

Preferably, the printer 200 waits while the applicator 100 performs the requested operation (for example, initiated by the control command). As soon as the applicator 100 sends (e.g., reports) a signal via the data interface 158 or 258 as a control command of completion of the operation, the printer 200 continues execution of the overall procedure control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably using a firmware of the applicator 100) executes the overall procedure control (i.e., the overall operation). In other words, the overall procedure control is stored (e.g., implemented or executably stored) in the applicator 100, for example, in the control unit 130 (preferably by means of firmware stored in the control unit 130). By executing the overall procedure control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall procedure control, for example, because only the printer 200 knows about the content and/or the presence of a print job.

To implement the interleaved (or alternating or nested) operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transferred (i.e., sent) from the applicator 100 to the printer 200. Alternatively or additionally, measured values of a sensor of the printer (for example, the light barrier 212) may be transferred (i.e., sent) from the printer 200 to the applicator 100. The applicator 100 or the printer 200 may determine (for example, calculate) sequence control parameters based on the measurands (or measured values) and/or transmit the measured values or the parameters to the computer or computer network 300 (for example, to application software) via the interface 222.

For example, the sensor 106 may sense or acquire a diameter or circumference of the conductor 102 (or the prolate object about its longitudinal axis). The control unit 130 and/or the control unit 230 may determine a length of a feed of the printing medium 208 and/or a selection of the printing medium 208, for example, depending on the sensed or acquired diameter or circumference.

Furthermore, when a defined threshold value is exceeded, these measured values may be transferred as a digital signal (for example, either as a state “0” or a state “1”) to the data interface 158 or 258, respectively, in order to indicate to the other (printer 200 or applicator 100) that a defined state (for example, the completion of an operation) has been reached. For example, reaching an end position or a reference point of an actuator (for example, the actuator 120 and/or 122) may be indicated.

A reference move (or reference run) of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequence control, and/or overall sequence control performed by the applicator 100 may comprise a motion (for example, a travel command) of the actuator, with the reference position serving as a reference point for the motions.

When the control unit 130 of the applicator 100 (for example, the applicator firmware) calculates one or more parameters of the applying (i.e., procedure control) from measured values (for example, transferred from the printer

200 or acquired from the sensor 104 and/or 106), the parameter(s) may be transferred to the control unit 230 of the printer 200 (preferably to the printer firmware thereof) in accordance with a communication protocol via the data interface 158 and 258. Furthermore, the control unit 130 of the applicator 100 (preferably its applicator firmware) may also use measurement data acquired by the printer 200 (for example, measurement data from the light barrier 212) to control the sequence control of the applicator (for example, as parameters of the applicator).

The embodiment of the printer 200 may comprise any or all of the features of any or all of the embodiments of the printer 200 described in the context of FIGS. 1A, 1B, FIGS. 2A, 2B, and/or FIGS. 3A, 3B.

The printer 200 may be configured to print normal labels, for example, when no device 100 is mounted to the mechanical interface 252 and/or the data interface 258.

The printer 200 may be a thermal transfer printer. The thermal transfer printer may provide high contrast and consistent marking 101. For example, the printer 200 may be a thermal transfer roll printer.

The embodiment of the printer 200 comprises an unroller 216 (or source roller) of the print media 208 disposed upstream of the print head 202, an unroller 218 of the print media 206 disposed upstream of the print head 202, and a rewinder 220 (or target roller) of the print media 206 disposed downstream of the print head 202.

An electrical interface 254 of the printer 200 is configured to supply electrical power to the applicator 100 mounted to the printer via the electrical interface 154 thereof.

Figure 5:
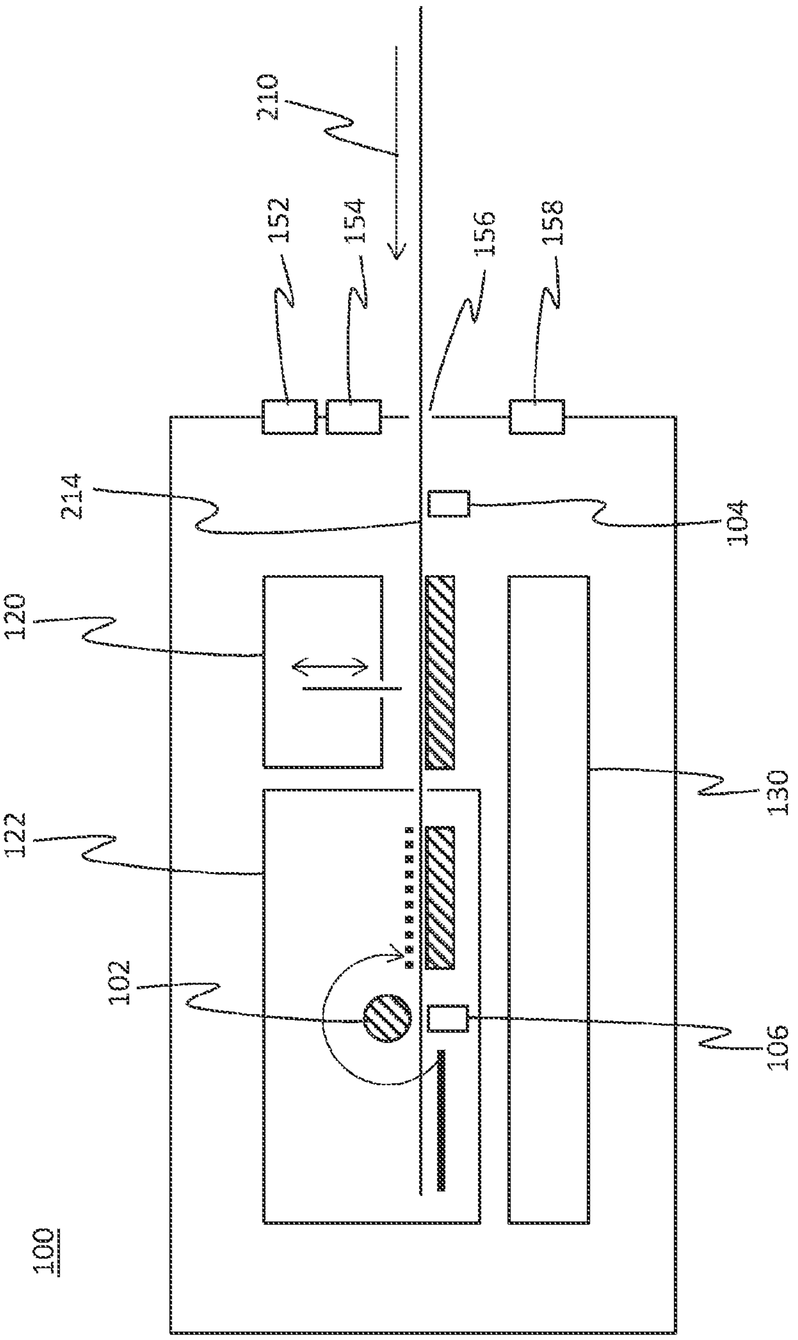
FIG. 5 a schematic sectional view of a fifth embodiment of the device for providing a marking arranged or arrangeable around an object in a first state.
Figure 6A:
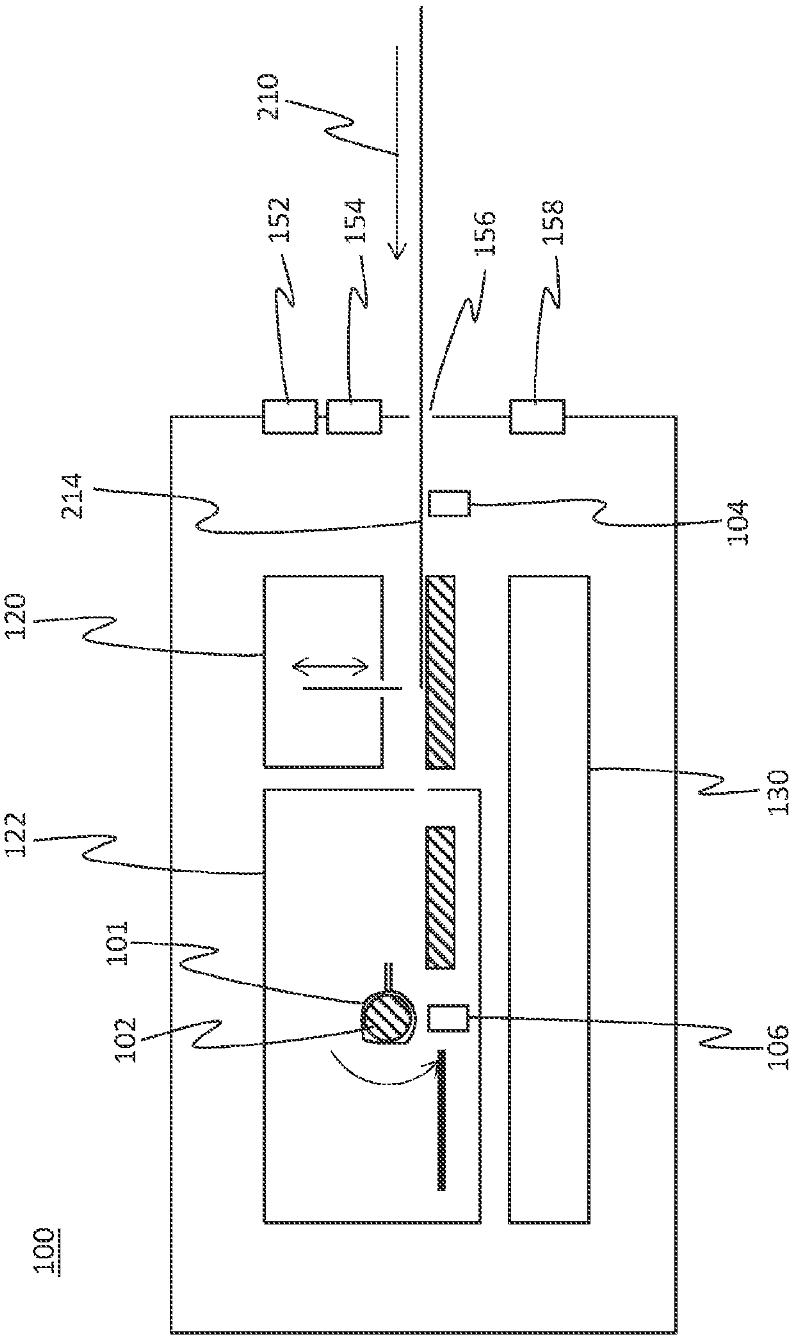
FIG. 6A a schematic sectional view of the fifth embodiment of the device in a second state.

FIGS. 5 and 6A show a schematic sectional view of a fifth embodiment of the applicator 100 (i.e., the device 100 for applying) a printed marking in a first state and a second state of application, respectively.

The fifth embodiment of the applicator 100 may be implemented independently or in further variant of any of the first through fourth embodiments of the applicator 100. Features of the first and second embodiments of the applicator 100, denoted by the same reference numerals, may be the same or interchangeable.

The fifth embodiment of the applicator 100 is configured to strike or fold a printed film as a printed product 214 around the conductor 102 by means of a second actuator 122 of the applicator 100. Preferably, the sensor 106 determines the diameter of the conductor 102. The control unit 130 calculates a length from the diameter and controls the printer (for example, its print roller 204) via the data interface 158 to feed the printed product 214 according to the determined length.

Figure 8:
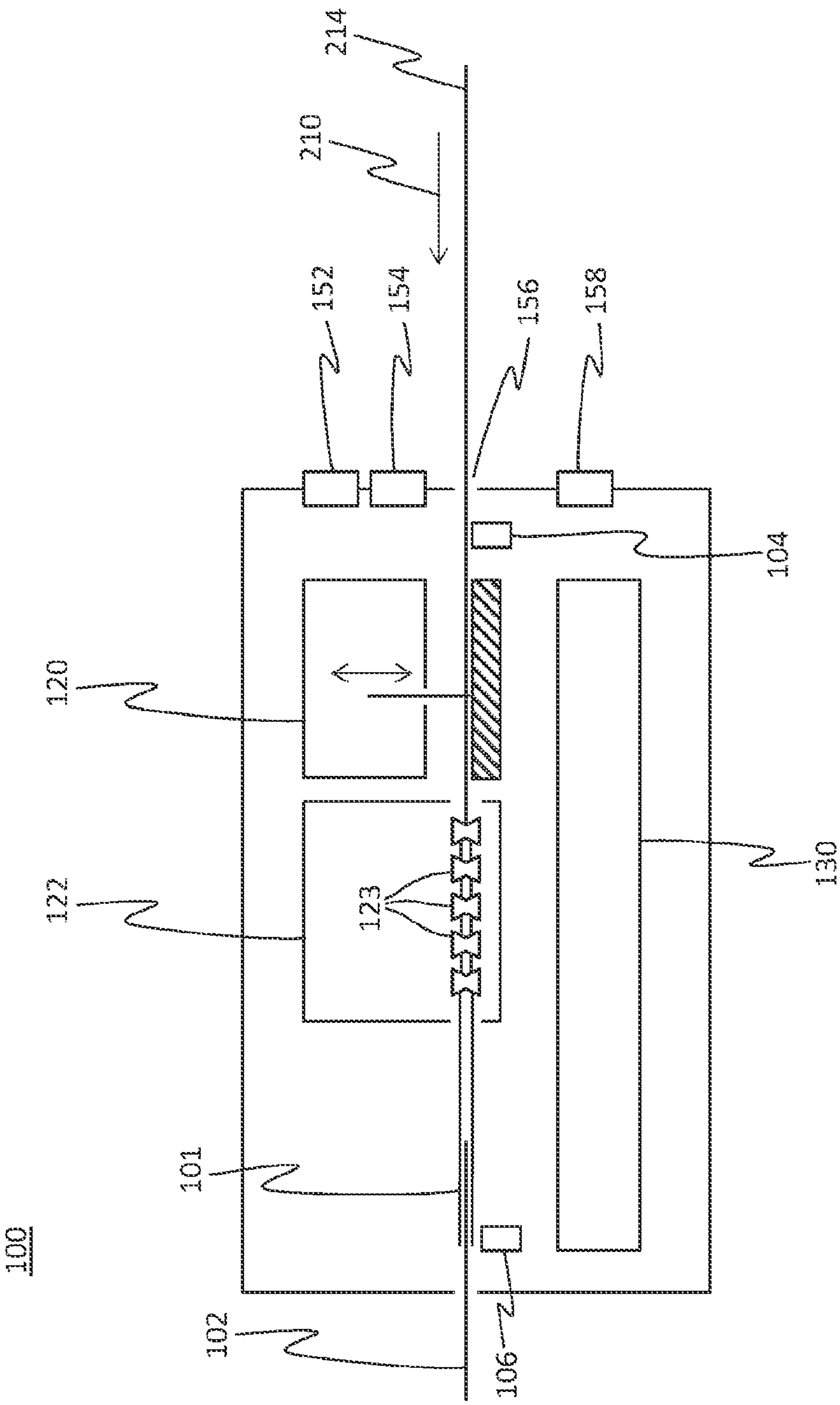
FIG. 8 a schematic sectional view of the sixth embodiment of the device in a second state.

After the feed, for example in the first state shown in FIG. 4 or 5 or the second state shown in FIG. 8, the printer 200 signals via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one variant, a further actuator) is configured to abut overlapping sections of the printed product by applying heat. A first actuator 120 of the applicator cuts the welded sections to a flush end of the marking 101.

In a first variant of the fifth embodiment of the applicator 100, a portion of the surface surrounding the conductor 102 is printed and the flush cut end is short compared to the circumference of the conductor 102. Preferably, the applying, i.e., a step of the procedure control of the applicator 100, comprises two embossments performed on the printed product before and after the printed portion by means of the actuator 120, as schematically shown in FIG. 6A.

For example, the procedure control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the procedure control of the applicator 100 may comprise waiting until the presence of the conductor 102 is detected or acquired by means of the sensor 106. Another step of the procedure control (i.e., the procedure control sequence) of the applicator 100 may comprise acquiring the diameter of the conductor 102 by means of the sensor 106 and calculating parameters of the applying (for example, partial lengths for feeds of the printed product 214).

In a further step, a further control command is sent from the control unit 130 to the printer 200. The further control command specifies a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cutting position. In a further step, in response to a notification of completion of the partial feed for the cutting position from the printer 200 to the applicator 100, the cut is performed by the actuator 122, the printed product is wrapped or folded around the conductor 102, sealing portions of the printed product 214 brought into contact with each other in a planar manner, and a cut performed by the actuator 120.

Figure 6B:
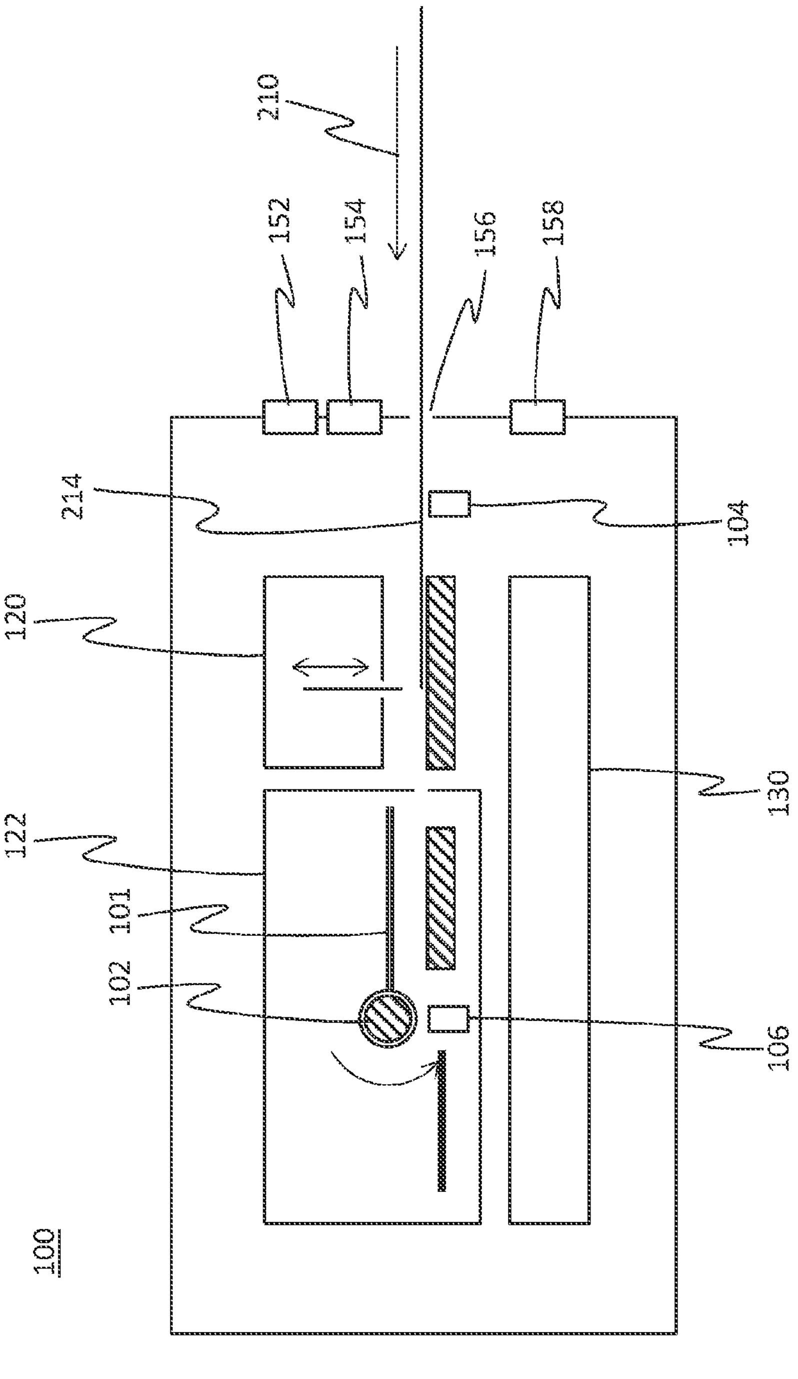
FIG. 6B a schematic sectional view of a variant of the fifth embodiment of the device in a second state.

In a second variant of the fifth embodiment of the applicator 100, the flush cut end is equal to or longer than the diameter of the conductor 102 and comprises the printed portion of the printed product 214, as schematically shown in FIG. 6B.

Figure 7:
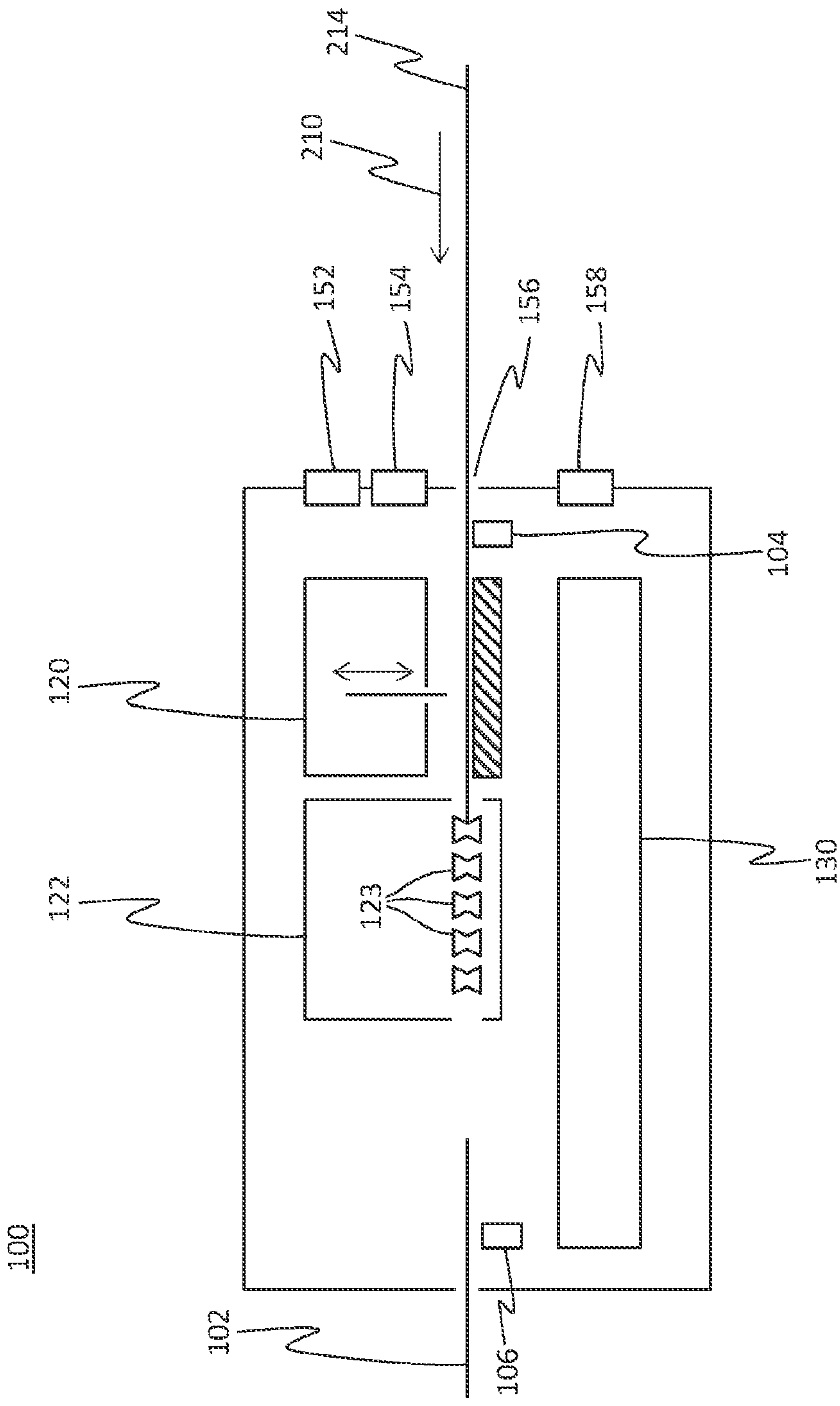
FIG. 7 a schematic sectional view of a sixth embodiment of a device for providing a marking arranged or arrangeable around an object in a first state.

FIGS. 7 and 8 show a schematic cross-sectional view of a sixth embodiment of the applicator 100 (i.e., the device 100 for applying) a printed marking in a first state and a second state of application, respectively.

The sixth embodiment of the applicator 100 may be implemented independently or in further embodiment of the first and/or second embodiment of the applicator 100. Features of any of the first through fifth embodiments of the applicator 100 designated by the same reference numerals may be the same or interchangeable.

The sixth embodiment of the applicator 100 is configured to push or attach a tube (for example, a heat-shrink tube) as a printing medium 208 or a printed tube as a printed product 214 to the conductor 102. When the tube is printed and/or cut (for example, by means of the first actuator 120 of the applicator), the tube is pressed flat, whereby its cut end or at least a portion of the printed tube may be closed, i.e., the cut edge or the inner sides of the tube adhere to each other.

The second actuator 122 (also: opening unit) is configured to open the cut edge of the printed tube adhering together and/or the inner sides (for example, an upper tube half and a lower tube half) of the printed tube adhering together. To this end, the second actuator 122 comprises waisted rollers 123 that apply a force in pairs to opposite lateral edges of the printed tube 214 to open the cut edge of the tube and/or to release the inner sides of the tube from each other. In the schematic illustration of FIGS. 7 and 8, one of each of the pairs of opposing rollers 123 is visible as the pairs are aligned perpendicular to the longitudinal direction or direction of movement 210.

In the second state shown in FIG. 8, the printed tube is opened by means of the second actuator 122, pushed onto the conductor as a marking 101 due to a feed of the printer 200, and cut off at the end by means of the first actuator 120.

Figure 9:
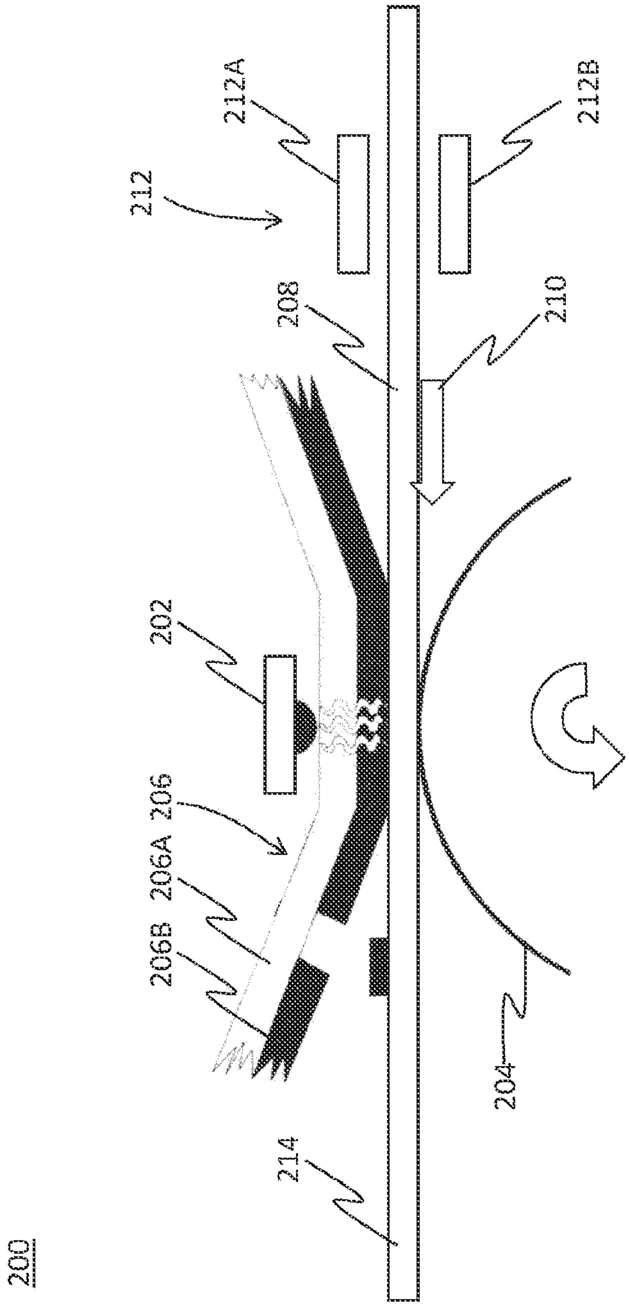
FIG. 9 a schematic sectional view of an embodiment of a printer as a thermal transfer printer, which can be combined with any embodiment of the device.

FIG. 9 schematically shows a further embodiment of the printer 200, which may be implemented independently or as a further development of one of the embodiments of the printer 200 described in the context of FIGS. 1A to 4. In this regard, individual or all features of the embodiments designated by the same reference numerals may be identical or interchangeable. For example, the print head 202 may be pivotally movable about a pivot axis 203 in mechanical coupling with the eccentric 140.

Alternatively or additionally, the further embodiment of the printer 200 may be configured to receive at least one or each of the first through sixth embodiments of the device 100 at its mechanical interface 252 and be moved by its eccentric 140 between the open position and the printing position.

Preferably, the further embodiment of the printer 200 is an example of a thermal transfer roll printer.

A control unit 230 of the printer 200 controls a feed and/or a retraction of the print medium 208 at the print head 202 and/or of the printed product 214 at the material interface 256 (and consequently at the material interface 156 of the device 100), depending on the signals from the light barrier 212 and/or control commands obtained from the device 100 via the data interface 258 (i.e., via the data interface 158 of the device 100). For this purpose, the control unit 230 may control a drive (for example, a stepper motor) for rotating the print roller 204.

Prior to a feed of the print medium 208 with printing on the print medium 208, the actuator 141 moves the eccentric 140 into the first pivot position. Due to the motion into the first pivot position, the eccentric 140 moves the print head 202 into the printing position, so that the printing material 206 is moved along with the printing feed of the print medium 208 (preferably transported without slip and/or transferred to the print medium 208 during printing).

Alternatively or additionally, the actuator 141 moves the eccentric 140 into the second pivot position at or before a feed of the print medium 208 without a printing of the print medium 208. Due to the motion into the second pivot position, the eccentric 140 moves the print head 202 into the open position, so that no printing material 206 is moved along with the non-printing feed of the print medium 208 (i.e., not transported unused).

The pivoting motion of the eccentric 140 and the feed of the print roller 204 may be controlled or regulated by the control system 130 of the device 100 or the control system 230 of the printer 200 via the data interfaces 158 and 258, respectively. Alternatively, the pivoting motion of the eccentric 140 and the feed of the print roller 204 may each be controlled or regulated by the control system 130 of the device 100 or the control system 230 of the printer 200, respectively, wherein the control systems 130 and 230 coordinate, for example synchronize, their respective actions via the data interfaces 158 and 258, respectively.

The light barrier 212 may be arranged in front of the print head 202 and/or the print roller 204 with respect to a direction of movement 210 of the print medium 208 during feed. The light barrier 212 may comprise, as exemplarily shown in FIG. 9, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for detecting the printing medium 208 in reflection.

The print head 202 comprises a plurality of heating elements. When the heating elements are heated (for example, energized) and the print roller 204 applies a predetermined (for example, sufficiently large) pressure to the print medium 208, the color pigments are transferred from the print material 206 (for example, a color ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the printing medium 208 and a color layer 206B (for example, a color wax) facing toward the printing medium 208.

The printer 200 is preferably a tabletop device to which the device 100 may be mounted as a replaceable or interchangeable module, for example, specific to an application or for the duration of a uniform application process.

Figure 10A:
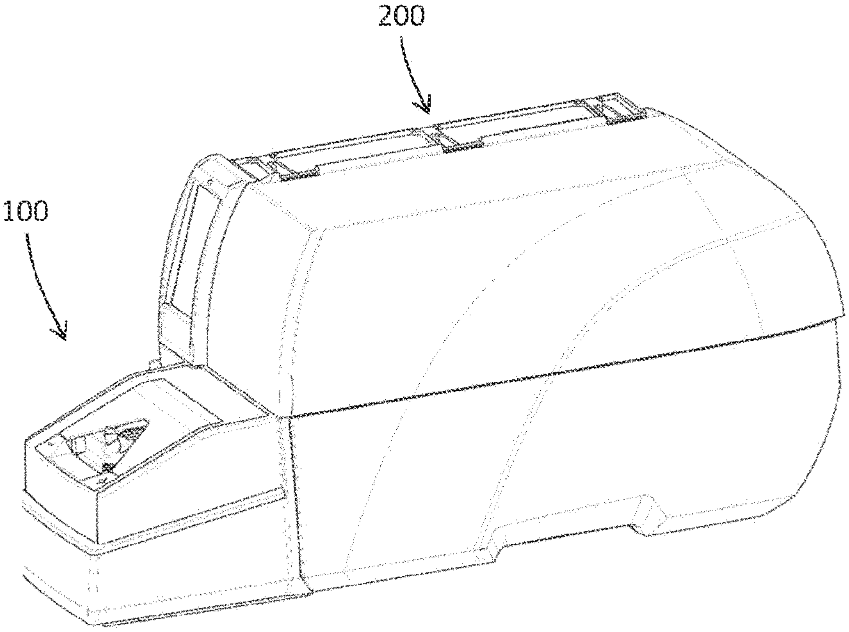
FIG. 10A a schematic perspective view of an exemplary printing system comprising an embodiment of the printer and an embodiment of the device for providing a marking in a mounted position.
Figure 10B:
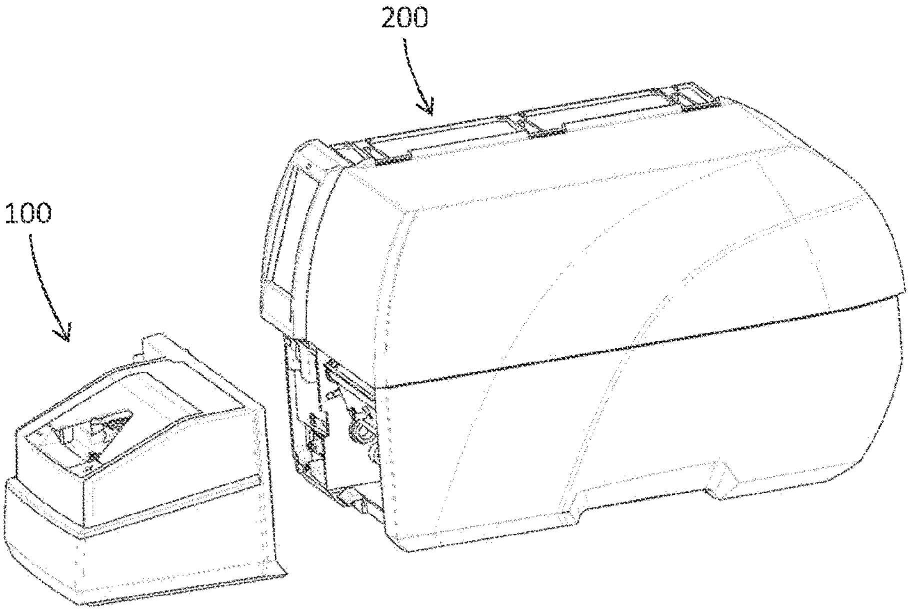
FIG. 10B a schematic perspective view of the exemplary printing system of FIG. 10A in a disassembled position.

FIG. 10A shows a schematic perspective view of an exemplary printing system (system for short), comprising an embodiment of the printer 200 and an embodiment of the device 100. In an exemplary mounted position of the device shown in FIG. 10A, all implemented physical interfaces are connected due to the arrangement of the device 100 on the printer 200. FIG. 10B shows a schematic perspective view of the exemplary printing system of FIG. 10A in a disassembled position. The physical interfaces are exposed.

A method of providing a marking 101 arranged or arrangeable around an object 102, preferably a conductor, may comprise at least one of the following steps S1 to S8. The method may comprise a printing and applying operation or use of the device 100 and the printer 200.

S1: An operator mounts (i.e., assembles) the applicator 100 to the printer 200 using the mechanical interface 152.

S2: The operator inserts the print medium 208 (also: printing material) into the printer 200, adjusts the light barrier 212 and/or other Setting options and brings the print head into the printing position (i.e. closes the print head 202)

S3: The operator switches on the printer 200.

S4: The printer 200 recognizes the applicator and initializes itself and the applicator 100.

S5: The operator sends a print job to the printer 200 using a print function (for example, an application program) of a personal computer 300 and/or a mobile device 300.

S6: The printer 200 detects the beginning of the print medium 208 to be printed via the light barrier 212.

S7: The printer 200 controls the entire process sequence (i.e. the overall process control). It receives signals and data about the current process step from the applicator 100 via the data interface 158 or 258.

S8: The applicator 100 reports data and signals back to the control system 230 (for example, a printer firmware executed by the control system 230) via the interface 158. These may be compared by the printer firmware with the pending or currently executed print job (e.g. plausibility check whether the object 102 to be marked matches the print job with respect to a measured diameter) or print data (for example parameters of the application or printing) are adjusted according to the feedback (e.g. adjustment of the print length in the longitudinal direction 210).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Device for providing a marking, for example applicator 100
Marking 101
Prolates object, preferably conductor, for example copper conductor or light conductor 102
Printing signal interface for a control signal to output the printed product, for example sensor for acquiring the printed product 104
Sensor of a control signal to provide the marking, for example sensor for acquiring the object or sensor for acquiring a provisioning request 106
First actuator of the device, for example cutting unit 120
Transverse direction 121
Second actuator of the device 122
Waisted rolls of the second actuator 123
Control unit or regulating unit of the device 130
Eccentric 140
Print head actor 141
Pivot axis of the eccentric 142
Suspension of the eccentric 144
Shaft of the eccentric 146
Lever for manually opening the print head 148
Mechanical interface of the device 152
Electrical interface of the device 154
Material interface of the device 156
Data interface of the device 158
Printer, for example thermal transfer printer 200
Print head of the printer 202
Pivot axis of the print head 203
Print roller of the printer 204
Printing material, for example color ribbon 206
Carrier material of the printing material, for example carrier foil 206A
Color layer of the printing material, for example ink or color wax 206B
Print medium of the printer (also: material to be printed) 208
Feed direction or longitudinal direction of the print medium 210
Light barrier of the printer 212
Light source of the light barrier 212A
Light sensor of the light barrier 212B
Printed product of the printer 214
Unwinder of the print medium 216
Unwinder of the printing material 218
Rewinder of the printing material 220
Data interface of the printer 222
Control unit of the printer 230
Mechanical interface of the printer 252
Electrical interface of the printer 254
Material interface of the printer 256
Data interface of the printer 258
Computer or computer network 300

The invention claimed is:

1. A device for providing a marking arranged or arrangeable around an object, comprising:
- a mechanical interface configured to releasably or irreversibly mount the device to a printer;
- a material interface configured to receive a print medium, which is printed by the printer using a print head, as a printed product in a longitudinal direction;
- at least one eccentric supported at the material interface to be pivotable about a pivot axis; and
- at least one print head actuator configured to move the at least one eccentric to a first pivot position and to a second pivot position different from the first pivot position to provide the marking originating from the printed product,
- wherein the eccentric is configured, in a state of the device mounted to the printer using the mechanical interface, to move the print head and the print medium towards each other into a printing position for printing the print medium when the eccentric moves into the first pivot position, and to move the print head and the print medium away from each other into an open position when the eccentric moves into the second pivot position.

2. The device of claim 1, wherein a printing material, is guided in the longitudinal direction between the print head and the printing medium.

3. The device of claim 2, wherein the printing material abuts the print head in the print position and in the open position.

4. The device of claim 2, wherein, in the printing position the printing material abuts the printing medium and/or is mechanically coupled to the printing medium in the longitudinal direction without slip, and/or
- wherein, in the open position the printing material is lifted off the printing medium and/or is mechanically decoupled.

5. The device of claim 2, wherein the printing material comprises a color ribbon.

6. The device of claim 2, wherein the printing material is guided in the longitudinal direction between the print head and the printing medium using a print roller.

7. The device of claim 1, wherein the pivot axis is perpendicular to the longitudinal direction, and/or wherein the pivot axis is parallel to a plane of the printed product, parallel to a pivot axis of the print head, and/or parallel to an axis of rotation of the print roller.

8. The device of claim 1, wherein the print head is subjected to a force including a preload in a direction from the open position to the print position.

9. The device of claim 8, wherein the at least one eccentric in the second pivot position moves the print head against the preload into the open position, and/or wherein the at least one eccentric in the first pivot position releases the print head for moving into the print position.

10. The device of claim 8, wherein a support surface of the at least one eccentric in the second pivot position abuts the print head on a side facing the material interface and/or the print roller, the support surface being eccentric relative to the pivot axis.

11. The device of claim 1, wherein the print head is subjected to a force including a preload in the direction from the print position to the open position.

12. The device of claim 11, wherein the at least one eccentric in the first pivot position moves the print head against the preload into the print position, and/or wherein the at least one eccentric in the second pivot position releases the print head for moving into the open position.

13. The device of claim 11, wherein a support surface of the at least one eccentric in the first pivot position abuts the print head on a side facing away from the material interface and/or the print roller, the support surface being eccentric relative to the pivot axis.

14. The device of claim 1, further comprising:

a suspension projecting beyond the material interface and, in a state of the device mounted using the mechanical interface, projecting into the printer, the at least one eccentric being pivotally arranged on the suspension.

15. The device of claim 14, wherein the suspension comprises at least two bolts parallel to each other, at a free end of each of the bolts a pivot bearing pivotally supports a shaft about the pivot axis, on which shaft the at least one eccentric is arranged in a rotationally fixed manner, and wherein the print head actuator is coupled to the shaft for the pivoting of the at least one eccentric.

16. The device of claim 1, further comprising:

at least one further actuator configured to arrange the marking, using the printed product output by the printer, on the object in a circumferentially closed manner or to provide the marking for the circumferentially closed arrangement.

17. The device of claim 16, further comprising:

a control unit or a regulating unit which is configured to move the at least one eccentric by the at least one print head actuator into the second pivoting position prior to advancing the printed product to a cutting position and/or prior to retracting the printed product already dispensed at the material interface and/or prior to retracting the print medium already dispensed at the material interface and still unprinted, and/or which is configured to move the at least one eccentric into the first pivoting position using the at least one print head actuator, after retracting the printed product or the still unprinted print medium.

18. A system for providing a marking arranged or arrangeable around an object, comprising:

a printer configured to output, in a longitudinal direction as a printed product, a print medium printed using a print head; and the device of claim 1, wherein, in a state of the device mounted to the printer using the mechanical interface, the material interface is arranged relative to the printer to receive the printed product output from the printer.

19. The device of claim 1, wherein the object comprises a conductor.

20. The system of claim 18, wherein the object comprises a conductor.

* * * * *